(12) United States Patent
Bares et al.

(10) Patent No.: US 8,248,211 B2
(45) Date of Patent: Aug. 21, 2012

(54) SELECTIVE RF DEVICE ACTIVATION

(75) Inventors: William Henry Bares, Los Gatos, CA (US); Daniel Noah Paley, Redwood City, CA (US); Lauren Marie Schlicht, Milpitas, CA (US)

(73) Assignee: Intelleflex Corporation, Santa Clara, CA (US)

( * ) Notice: Subject to any disclaimer, the term of this patent is extended or adjusted under 35 U.S.C. 154(b) by 2115 days.

(21) Appl. No.: 11/186,666

(22) Filed: Jul. 20, 2005

(65) Prior Publication Data

US 2007/0018794 A1 Jan. 25, 2007

(51) Int. Cl.
*H04Q 5/22* (2006.01)
*H04J 3/24* (2006.01)

(52) U.S. Cl. ..................... 340/10.3; 370/349

(58) Field of Classification Search ............. 340/10.3, 340/10.31, 10.32, 825.52; 370/349
See application file for complete search history.

(56) References Cited

U.S. PATENT DOCUMENTS

| | | | |
|---|---|---|---|
| 3,689,885 A | 9/1972 | Kaplan et al. ............... 340/152 T |
| 3,890,581 A | 6/1975 | Stuart et al. ................. 332/11 R |
| 4,004,283 A * | 1/1977 | Bennett et al. ............... 710/262 |
| 4,325,146 A | 4/1982 | Lennington ................. 455/604 |
| 4,525,713 A | 6/1985 | Barletta et al. ........... 340/825.54 |
| 4,646,090 A | 2/1987 | Mawhinney .................. 342/44 |
| 4,730,188 A | 3/1988 | Milheiser ..................... 340/825 |
| 4,839,642 A | 6/1989 | Batz et al. ................. 340/825.54 |
| 4,879,756 A | 11/1989 | Stevens et al. ............... 455/39 |
| 4,928,275 A | 5/1990 | Moore et al. ................. 370/102 |
| 4,937,586 A | 6/1990 | Stevens et al. ............... 343/702 |
| 4,955,038 A | 9/1990 | Lee et al. ..................... 375/35 |
| 5,028,918 A | 7/1991 | Giles et al. ............... 340/825.54 |
| 5,041,826 A | 8/1991 | Milheiser ................. 340/825.54 |
| 5,089,813 A * | 2/1992 | DeLuca et al. ............... 340/7.35 |
| 5,109,221 A | 4/1992 | Lambropoulos et al. ................. 340/825.69 |
| 5,166,676 A | 11/1992 | Milheiser ................. 340/825.54 |

(Continued)

FOREIGN PATENT DOCUMENTS

EP 0702323 3/1996

OTHER PUBLICATIONS

PCT Search Report from application No. PCT/US2006/028282 which was mailed on Jan. 12, 2007.

(Continued)

*Primary Examiner* — Brian Zimmerman
*Assistant Examiner* — Omer S Khan
(74) *Attorney, Agent, or Firm* — Zilka-Kotab, PC

(57) ABSTRACT

Systems and methods for activating one or more devices are disclosed. According to one embodiment, the device listens for an activate code, the activate code having a length field and a mask field, the mask field including a mask value, the length field specifying a length of the mask field to a final bit of the mask value. Upon receiving the activate code, the length field is compared to a stored length value for determining whether the length field meets a predefined criterion. If the length field meets the predefined criterion, an address of the activate value is loaded (if an address field is present) and the appropriate bits (mask value) of the mask field are compared to a stored activate value. An activate signal is generated if the mask value matches the stored activate value. The activate signal can be used to activate additional circuitry including the entire device.

2 Claims, 15 Drawing Sheets

U.S. PATENT DOCUMENTS

| | | | |
|---|---|---|---|
| 5,245,332 A | 9/1993 | Katzenstein | 340/825.54 |
| 5,305,008 A | 4/1994 | Turner et al. | 342/44 |
| 5,345,231 A | 9/1994 | Koo et al. | 340/870.31 |
| 5,410,315 A | 4/1995 | Huber | 342/42 |
| 5,489,908 A | 2/1996 | Orthmann et al. | 342/42 |
| 5,491,482 A | 2/1996 | Dingwall et al. | 342/42 |
| 5,502,445 A | 3/1996 | Dingwall et al. | 342/51 |
| 5,521,601 A | 5/1996 | Kandlur et al. | 342/44 |
| 5,525,992 A | 6/1996 | Froschermeier | 342/42 |
| 5,530,702 A | 6/1996 | Palmer et al. | 370/85.3 |
| 5,548,291 A | 8/1996 | Meier et al. | 342/51 |
| 5,550,536 A | 8/1996 | Flaxl | 340/825.54 |
| 5,606,313 A | 2/1997 | Allen et al. | 340/825.54 |
| 5,621,412 A | 4/1997 | Sharpe et al. | 342/51 |
| 5,673,037 A | 9/1997 | Cesar et al. | 340/825.54 |
| 5,684,828 A | 11/1997 | Bolan et al. | 375/238 |
| 5,774,064 A | 6/1998 | Lambropoulos et al. | 340/825.69 |
| 5,838,257 A | 11/1998 | Lambropoulos | 340/825.54 |
| 5,856,788 A | 1/1999 | Walter et al. | 340/825.54 |
| 5,887,176 A | 3/1999 | Griffith et al. | 395/750 |
| 6,104,333 A | 8/2000 | Wood, Jr. | 341/173 |
| 6,130,602 A | 10/2000 | O'Toole et al. | 340/10.33 |
| 6,130,603 A | 10/2000 | Briechle | 340/10.34 |
| 6,150,921 A | 11/2000 | Werb et al. | 340/10.1 |
| 6,172,596 B1 | 1/2001 | Cesar et al. | 340/10.41 |
| 6,177,858 B1 | 1/2001 | Raimbault et al. | 340/10.1 |
| 6,239,690 B1 | 5/2001 | Burbidge et al. | 340/10.33 |
| 6,249,212 B1 | 6/2001 | Beigel et al. | 340/10.34 |
| 6,265,963 B1 | 7/2001 | Wood, Jr. | 340/10.4 |
| 6,278,698 B1 | 8/2001 | O'Toole et al. | 370/311 |
| 6,310,558 B1 | 10/2001 | Minami | 340/825.52 |
| 6,333,690 B1 | 12/2001 | Nelson et al. | 340/539 |
| 6,337,634 B1 | 1/2002 | O'Toole et al. | 340/825.56 |
| 6,342,830 B1 | 1/2002 | Want et al. | 340/10.1 |
| 6,351,215 B2 | 2/2002 | Rodgers et al. | 340/572.1 |
| 6,353,406 B1 | 3/2002 | Lanzl et al. | 342/118 |
| 6,362,738 B1 | 3/2002 | Vega | 340/572.1 |
| 6,388,575 B1 | 5/2002 | Galloway | 340/572.1 |
| 6,411,199 B1 | 6/2002 | Geiszler et al. | 340/10.1 |
| 6,441,719 B1 * | 8/2002 | Tsui | 340/5.21 |
| 6,452,980 B1 | 9/2002 | Zalud et al. | 375/285 |
| 6,466,634 B1 | 10/2002 | O'Toole et al. | 375/374 |
| 6,469,618 B1 | 10/2002 | Gaultier | 340/10.3 |
| 6,535,109 B1 | 3/2003 | Mahdavi | 340/10.3 |
| 6,593,845 B1 | 7/2003 | Friedman et al. | 340/10.33 |
| 6,600,428 B1 | 7/2003 | O'Toole et al. | 340/825.36 |
| 6,603,391 B1 | 8/2003 | Greeff et al. | 340/10.3 |
| 6,611,198 B1 | 8/2003 | Geiszler et al. | 340/10.41 |
| 6,617,963 B1 | 9/2003 | Watters et al. | 340/10.41 |
| 6,630,885 B2 | 10/2003 | Hardman et al. | 340/505 |
| 6,653,937 B2 | 11/2003 | Nelson et al. | 340/539.1 |
| 6,661,336 B1 | 12/2003 | Atkins et al. | 340/10.2 |
| 6,690,264 B2 | 2/2004 | Dalglish | 340/10.4 |
| 6,693,511 B1 | 2/2004 | Seal | 340/10.1 |
| 6,696,879 B1 | 2/2004 | O'Toole et al. | 327/356 |
| 6,721,289 B1 | 4/2004 | O'Toole et al. | 370/311 |
| 6,735,183 B2 | 5/2004 | O'Toole et al. | 370/311 |
| 6,765,476 B2 | 7/2004 | Steele et al. | 340/10.4 |
| 6,765,484 B2 | 7/2004 | Eagleson et al. | 340/505 |
| 6,771,613 B1 | 8/2004 | O'Toole et al. | 370/277 |
| 6,774,685 B2 | 8/2004 | O'Toole et al. | 327/156 |
| 6,831,548 B1 | 12/2004 | Eber et al. | 340/10.33 |
| 7,375,637 B2 | 5/2008 | Mickle et al. | 40/572.1 |
| 2001/0050580 A1 | 12/2001 | O'Toole et al. | 327/158 |
| 2002/0024422 A1 | 2/2002 | Turner et al. | 340/10.3 |
| 2002/0063622 A1 | 5/2002 | Armstrong et al. | 340/10.31 |
| 2002/0109597 A1 | 8/2002 | Nelson et al. | 340/573.1 |
| 2002/0126005 A1 | 9/2002 | Hardman et al. | 340/442 |
| 2002/0175805 A9 | 11/2002 | Armstrong et al. | 340/10.31 |
| 2002/0175806 A1 | 11/2002 | Marneweck et al. | 340/10.33 |
| 2003/0104848 A1 | 6/2003 | Brideglall | 455/574 |
| 2003/0128100 A1 | 7/2003 | Burkhardt et al. | 340/5.8 |
| 2003/0149526 A1 | 8/2003 | Zhou et al. | 701/213 |
| 2004/0017291 A1 | 1/2004 | Hardman et al. | 340/505 |
| 2004/0027240 A1 | 2/2004 | Greeff et al. | 340/10.3 |
| 2004/0046642 A1 | 3/2004 | Becker et al. | 340/10.32 |
| 2004/0140884 A1 | 7/2004 | Gallagher, III et al. | 340/10.2 |
| 2004/0160306 A1 | 8/2004 | Stilp | 340/5.61 |
| 2004/0160309 A1 | 8/2004 | Stilp | 340/10.2 |
| 2004/0201457 A1 | 10/2004 | O'Toole et al. | 340/10.33 |
| 2004/0223481 A1 | 11/2004 | Juels et al. | 370/345 |
| 2005/0052283 A1 | 3/2005 | Collins et al. | 340/572.7 |
| 2005/0057368 A1 | 3/2005 | Corbett et al. | 340/825.49 |
| 2005/0077349 A1 | 4/2005 | Bonalle et al. | 235/380 |

OTHER PUBLICATIONS

U.S. Appl. No. 60/673,715, filed Apr. 21, 2005.

Chinese Office Action from application No. 200680026302.X dated Jul. 22, 2011 (no translation).

Chinese Office Action Summary from application No. 200680026302.X dated Feb. 23, 2011 (no translation).

European Office Action Summary from application No. 06800180.9 mailed on Oct. 23, 2009.

\* cited by examiner

SELECTIVE RF DEVICE ACTIVATION

FIELD OF THE INVENTION

The present invention relates to Radio Frequency (RF) tag activation, and more particularly, this invention relates to functional activation of RF tags and other electronic RF devices.

BACKGROUND OF THE INVENTION

Automatic identification ("Auto-ID") technology is used to help machines identify objects and capture data automatically. One of the earliest Auto-ID technologies was the bar code, which uses an alternating series of thin and wide bands that can be digitally interpreted by an optical scanner. This technology gained widespread adoption and near-universal acceptance with the designation of the universal product code ("UPC")—a standard governed by an industry-wide consortium called the Uniform Code Council. Formally adopted in 1973, the UPC is one of the most ubiquitous symbols present on virtually all manufactured goods today and has allowed for enormous efficiency in the tracking of goods through the manufacturing, supply, and distribution of various goods.

However, the bar code still requires manual interrogation by a human operator to scan each tagged object individually with a scanner. This is a line-of-sight process that has inherent limitations in speed and reliability. In addition, the UPC bar codes only allow for manufacturer and product type information to be encoded into the barcode, not the unique item's serial number. The bar code on one milk carton is the same as every other, making it impossible to count objects or individually check expiration dates.

Currently cartons are marked with barcode labels. These printed labels have over 40 "standard" layouts, can be misprinted, smeared, mis-positioned and mis-labeled. In transit, these outer labels are often damaged or lost. Upon receipt, the pallets typically have to be broken-down and each case scanned into an enterprise system. Error rates at each point in the supply chain have been 4-18% thus creating a billion dollar inventory visibility problem. Only with radio frequency identification ("RFID") does the physical layer of actual goods automatically tie into software applications, to provide accurate tracking.

The emerging RFID technology employs a radio frequency ("RF") wireless link and ultra-small embedded computer chips, to overcome these barcode limitations. RFID technology allows physical objects to be identified and tracked via these wireless "tags". It functions like a bar code that communicates to the reader automatically without needing manual line-of-sight scanning or singulation of the objects. RFID promises to radically transform the retail, pharmaceutical, military, and transportation industries.

The advantages of RFIDs over bar code are summarized in Table 1:

TABLE 1

| Barcode | RFID |
|---|---|
| Need line-of-sight to read | Identification without visual contact |
| Read only | Able to read/write |
| Only a barcode number | Able to store information in tag |
| Barcode number is fixed | Information can be renewed anytime |
| Category level tagging only-no unique item identifier | Unique item identification |
| Unable to read if barcode is damaged | Can withstand harsh environment |
| Use once | Reusable |
| Low cost | Higher cost |
| Less Flexibility | Higher Flexibility/Value |

As shown in FIG. 1, an RFID system 100 includes a tag 102, a reader 104, and an optional server 106. The tag 102 includes an IC chip and an antenna. The IC chip includes a digital decoder needed to execute the computer commands that the tag 102 receives from the tag reader 104. The IC chip also includes a power supply circuit to extract and regulate power from the RF reader; a detector to decode signals from the reader; a backscatter modulator, a transmitter to send data back to the reader; anti-collision protocol circuits; and at least enough memory to store its EPC code.

Communication begins with a reader 104 sending out signals to find the tag 102. When the radio wave hits the tag 102 and the tag 102 recognizes and responds to the reader's signal, the reader 104 decodes the data programmed into the tag 102. The information is then passed to a server 106 for processing, storage, and/or propagation to another computing device. By tagging a variety of items, information about the nature and location of goods can be known instantly and automatically.

Many RFID systems use reflected or "backscattered" radio frequency (RF) waves to transmit information from the tag 102 to the reader 104. Since passive (Class-1 and Class-2) tags get all of their power from the reader signal, the tags are only powered when in the beam of the reader 104.

The Auto ID Center EPC-Compliant tag classes are set forth below:
  Class-1
    Identity tags (RF user programmable, maximum range 3 m)
    Lowest cost
  Class-2
    Memory tags (8 bits to 128 Mbits programmable at maximum 3 m range)
    Security & privacy protection
    Low cost
  Class-3
    Semi-Active tags
    Battery tags (256 bits to 64 Kb)
    Self-Powered Backscatter (internal clock, sensor interface support)
    100 meter range
    Moderate cost
  Class-4
    Active tags
    Active transmission (permits tag-speaks-first operating modes)
    Up to 30,000 meter range
    Higher cost In RFID systems where passive receivers (i.e., Class-1 and Class-2 tags) are able to capture enough energy from the transmitted RF to power the device, no batteries are necessary. In systems where distance prevents powering a device in this manner, an alternative power source must be used. For these "alternate" systems (also known as active or semi-passive), batteries are the most common form of power. This greatly increases read range, and the reliability of tag reads, because the tag doesn't need power from the reader. Class-3 tags only need a 10 mV signal from the reader in comparison to the 500 mV that a Class-1 tag needs to operate. This 2,500:1 reduction in power requirement permits Class-3 tags to operate out to a distance of 100 meters or more compared with a Class-1 range of only about 3 meters.

Early field trials have shown that the currently available passive short-range Class-1 and Class-2 tags are often inadequate for tagging pallets and many types of cases. The problems with these passive tags are particularly severe when working with "RF-unfriendly" materials like metal (like soup cans), metal foils (like potato chips), or conductive liquids (like soft drinks, shampoo). No one can consistently read case tags located in the interior of a stack of cases—as occurs in a warehouse or pallet. The existing passive tags are also inadequate to tag large or rapidly moving objects like trucks, cars, shipping containers, etc.

Class-3 tags solve this problem by incorporating batteries and signal preamplifiers to increase range. This battery will last many years if power consumption is managed well, but only a few days if power consumption is managed poorly. Because battery powered systems (also known as active devices) will coexist with passive devices, care must be taken to reduce the power drain of the battery powered systems. Class-1 RFID tags, for example, receive their operating power from the Reader (Transmitted power). The definition of Class-3 RFID devices requires distances sufficient to make this an unusable power source. Additionally, Class-3 devices must co-exist in Class-1 environments and care must be taken to manage power drain from the battery of all active or semi-active devices. If a Class-3 device continually responds to unwanted Class-1 instructions (these being commands for "other" devices) battery power will be drained extremely quickly.

Wake up codes have been used in RFID systems to selectively "wake up" individual tags and not others, thereby conserving the battery life of the tags that are not needed and/or reducing the amount of signal received back from a given set of tags. Typically, the reader broadcasts a wake up code, and each tag activates just long enough to determine whether the broadcast code matches a code stored in the tag's memory. If the codes match, the tag fully activates. If the codes do not match, the tag returns to a hibernate state or does not respond further to the reader.

The use of wake up codes has been proven to be effective at reducing overall battery consumption in Class-3 devices. However, it would be desirable to eliminate the need for all tags receiving a broadcasted wake up code to analyze the wake up code to determine whether the wake up code corresponds to that particular tag. Thus, it would be desirable to add some type of encoding to indicate early on during receipt of the wake up code whether or not to continue to analyze the rest of the wake up code string.

SUMMARY OF THE INVENTION

Systems and methods for activating one or more devices are disclosed. According to one embodiment, the device listens for an activate code, the activate code having a length field and a mask field, the mask field including a mask value, the length field specifying a length of the mask field to a final bit of the mask value. Upon receiving the activate code, the length field is compared to a stored length value for determining whether the length field meets a predefined criterion. If the length field meets the predefined criterion, an address of the activate value is loaded (if an address field is present) and the appropriate bits (mask value) of the mask field are compared to a stored activate value. An activate signal is generated if the mask value matches the stored activate value. The activate signal can be used to activate additional circuitry.

According to another embodiment, the device listens for an activate code, the activate code having a length field and a mask field, the mask field including a mask value, the length field specifying a position of a final bit of the mask value in the mask field. The appropriate bits (mask value) of the mask field are compared to a stored activate value. The comparison is terminated upon comparing the final bit of the mask field as specified by the length field. An activate signal is generated if the mask value matches the stored activate value. The activate signal can be used to activate additional circuitry.

A method for activating a device according to another embodiment includes receiving an activate code having an address field and a mask field, where the mask field has a mask value, wherein the address field indicates a start position of the mask value in the mask field. The mask value is compared to an activate value stored on the device.

A method for analyzing an activate code having a length field and a mask field according to another embodiment includes receiving the length field, comparing the length field to a stored length value, determining whether the length field meets a predefined criteria based on the comparison of the length field to the stored length value, receiving the mask field, the mask field having a mask value, comparing the mask value of the mask field to a stored activate value if the length field meets the predefined criteria, and generating an activate signal if the received mask value matches the stored activate value.

A method for analyzing an activate code having an address field and a mask field according to yet another embodiment includes receiving the address and mask fields, where the address field indicates a location of the mask value in the mask field. The mask value of the mask field is compared to a stored activate value. An activate signal is generated if the received mask value matches the stored value.

A system comprising an interrogator and a plurality of devices in radio frequency communication with the interrogator, wherein a first subset of the devices are responsive to an activate command of a first length, wherein a second subset of the devices are responsive to an activate command of a second length.

A circuit for selectively generating an activate signal according to one embodiment includes an interrupt circuit for determining whether an interrupt period of a received signal matches a predetermined plurality of values or falls within a predetermined range, the interrupt circuit outputting an interrupt signal if the interrupt period matches the predetermined value or falls within the predetermined range. A data comparison circuit compares a received activate code to a stored activate value, the activate code having a length field and a mask field, the length field specifying at least one of (i) a length of the mask field and (ii) a position of a final bit of a mask value of the mask field, the data comparison circuit generating an activate signal if the received mask value matches the stored activate value.

A circuit for analyzing an activate code having a length field and a mask field, according to another embodiment includes a data register for storing an activate value, a length counter for receiving the length field, and a data comparison circuit for comparing at least a portion of the mask field to the activate value. The data comparison circuit generates an activate signal if the portion of the mask field matches the activate value.

A method for selectively activating a subset of a plurality of devices according to another embodiment includes transmitting an activate code having a length field and a mask field, where the length field dictates which of the plurality of devices process the mask field.

Another method for selectively activating a subset of a plurality of devices includes transmitting several activate codes to a plurality of remote devices, where only a subset of the devices analyze a particular one of the activate codes based upon a variable size of the code.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

The following specification describes systems and methods in which multiple variants of an activation or "wake up" code are used, not just to wake up the tag, but also to indicate which subset of tags should fully analyze the activate code.

Figure 1:
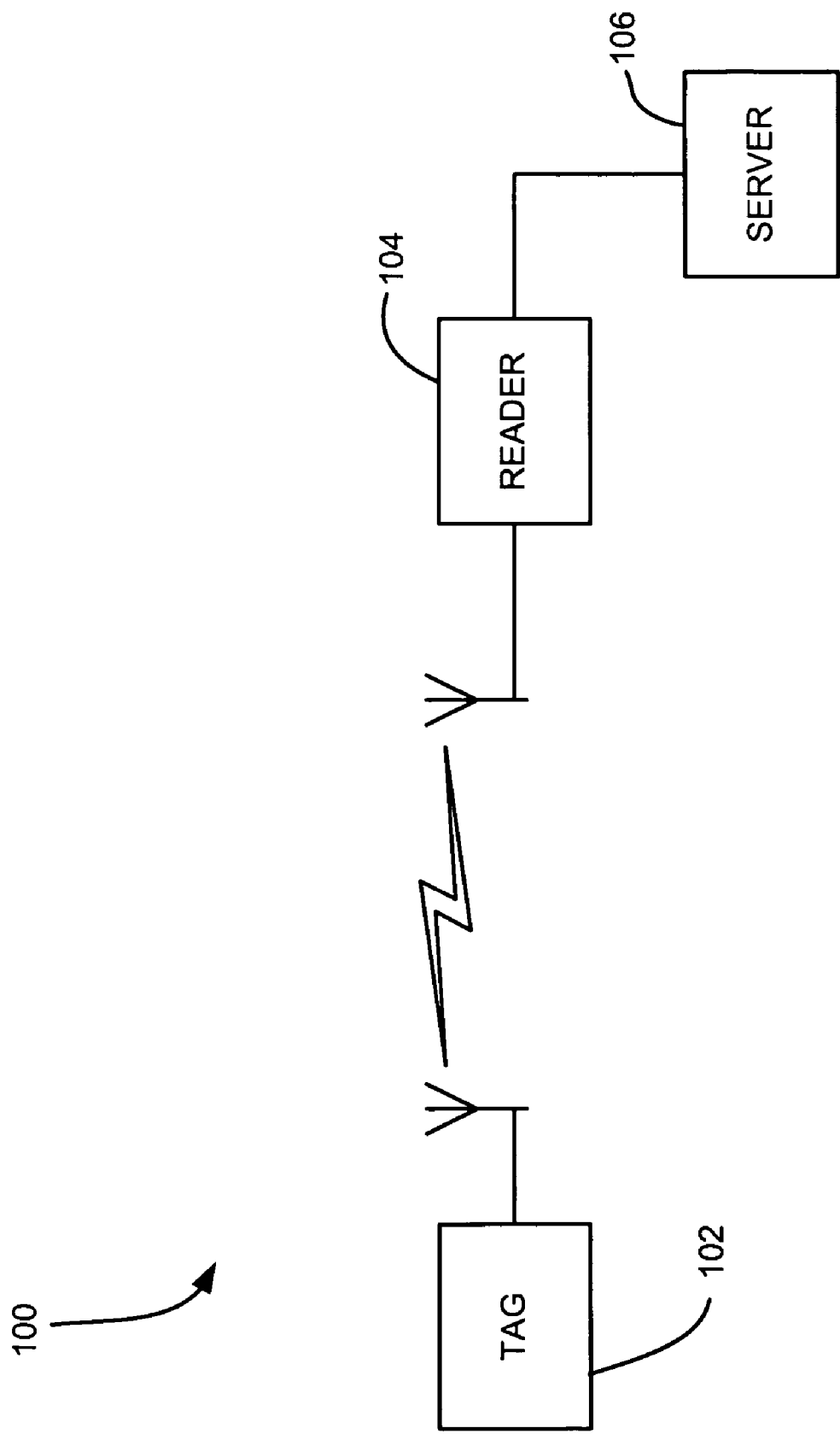
FIG. 1 is a system diagram of an RFID system.

Many types of devices can take advantage of the embodiments disclosed herein, including but not limited to Radio Frequency Identification (RFID) systems and other wireless devices/systems; pacemakers; portable electronic devices; audio devices and other electronic devices; smoke detectors; etc. To provide a context, and to aid in understanding the embodiments of the invention, much of the present description shall be presented in terms of an RFID system such as that shown in FIG. 1. It should be kept in mind that this is done by way of example only, and the invention is not to be limited to RFID systems, as one skilled in the art will appreciate how to implement the teachings herein into electronics devices in hardware and/or software. Examples of hardware include Application Specific Integrated Circuits (ASICs), printed circuits, monolithic circuits, reconfigurable hardware such as Field Programmable Gate Arrays (FPGAs), etc. Further, the methodology disclosed herein can also be incorporated into a computer program product, such as a computer disc containing software. Further, such software can be downloadable or otherwise transferable from one computing device to another via network, nonvolatile memory device, etc.

Figure 2:
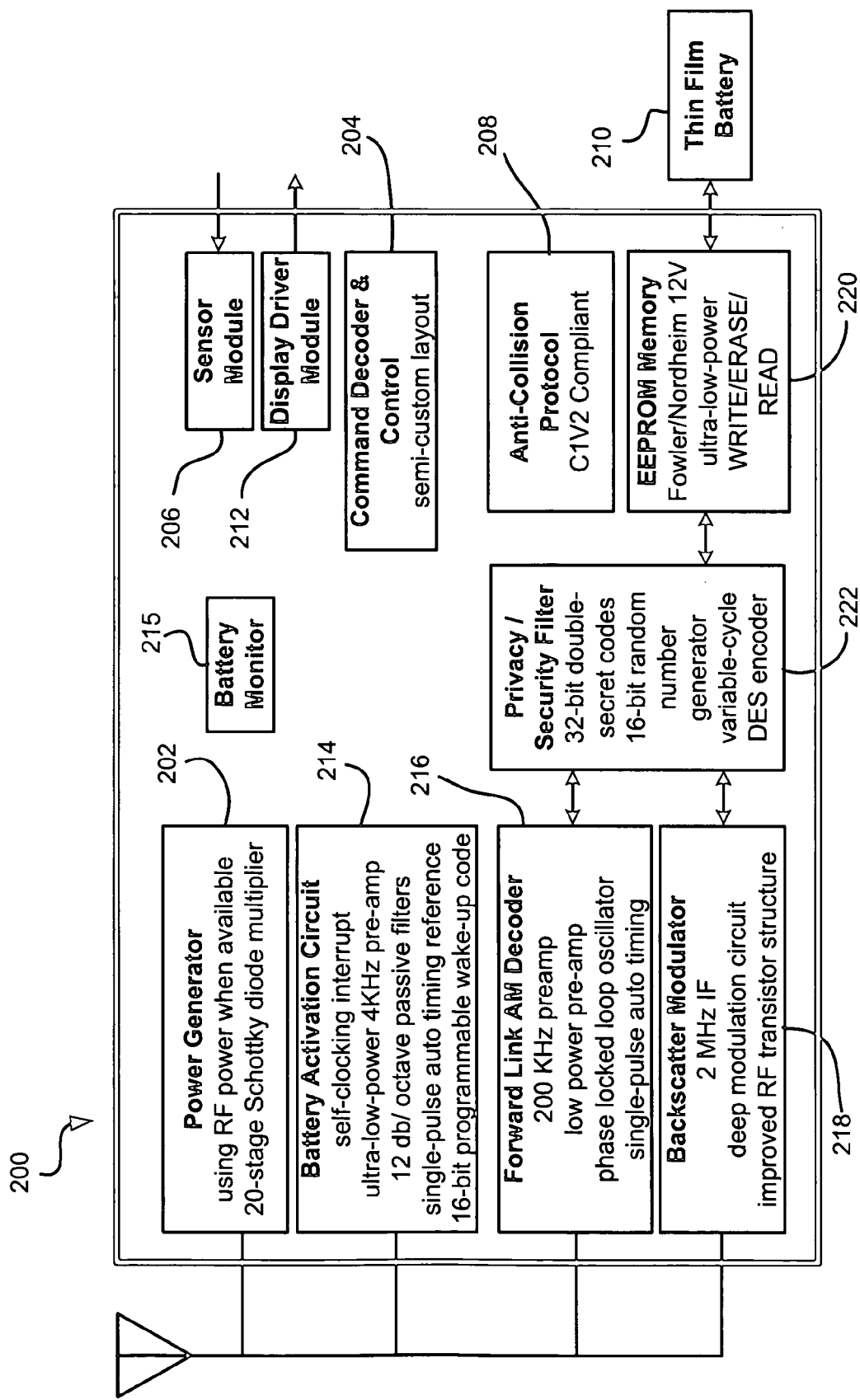
FIG. 2 is a system diagram for an integrated circuit (IC) chip for implementation in an RFID tag.

Embodiments of the present invention are preferably implemented in a Class-3 or higher Class chip. FIG. 2 depicts a circuit layout of a Class-3 chip 200 according to an illustrative embodiment for implementation in an RFID tag. This Class-3 chip can form the core of RFID chips appropriate for many applications such as identification of pallets, cartons, containers, vehicles, or anything where a range of more than 2-3 meters is desired. As shown, the chip 200 includes several industry-standard circuits including a power generation and regulation circuit 202, a digital command decoder and control circuit 204, a sensor interface module 206, a C1V2 interface protocol circuit 208, and a power source (battery) 210. A display driver module 212 can be added to drive a display.

A battery activation circuit 214 is also present to act as a wake-up trigger. This circuit 214 is described in detail below. In brief, the battery activation circuit 214 includes an ultra-low-power, narrow-bandwidth preamplifier with an ultra low power static current drain. The battery activation circuit 214 also includes a self-clocking interrupt circuit and uses an innovative user-programmable digital wake-up code. The battery activation circuit 214 draws less power during its sleeping state and is much better protected against both accidental and malicious false wake-up trigger events that otherwise would lead to pre-mature exhaustion of the Class-3 tag battery 210.

A battery monitor 215 can be provided to monitor power usage in the device. The information collected can then be used to estimate a useful remaining life of the battery.

A forward link AM decoder 216 uses a simplified phase-lock-loop oscillator that requires an absolute minimum amount of chip area. Preferably, the circuit 216 requires only a minimum string of reference pulses.

A backscatter modulator block 218 preferably increases the backscatter modulation depth to more than 50%.

A memory cell, e.g., EEPROM is also present. In one embodiment, a pure, Fowler-Nordheim direct-tunneling-through-oxide mechanism 220 is present to reduce both the WRITE and ERASE currents to less than 0.1 µA/cell in the EEPROM memory array. Unlike any RFID tags built to date, this will permit designing of tags to operate at maximum range even when WRITE and ERASE operations are being performed.

The module 200 also incorporates a highly-simplified, yet very effective, security encryption circuit 222 such as the one described in US Patent Appl. entitled "SECURITY SYSTEM AND METHOD" and having Ser. No. 10/902,683, filed on Jul. 28, 2004 and which is herein incorporated by reference. Other security schemes, secret handshakes with readers, etc. can be used.

Only four connection pads (not shown) are required for the chip 200 to function: Vdd to the battery, ground, plus two antenna leads to support multi-element omni-directional antennas. Sensors to monitor temperature, shock, tampering, etc. can be added by appending an industry-standard I2C interface to the core chip.

Extremely low-cost Class-2 security devices can be built by simply disabling or removing the pre-amplifiers, and/or IF modules from the Class-3 chip core.

The battery activation circuit 214 described herein is used in communication between two devices where a transmitter wants to activate or enable a receiving device via the Radio Frequency (RF) medium. While this circuitry anticipated for use in RFID systems, it is by no means restricted to just that industry. This disclosure describes an activation circuit where the preferred description and embodiment relates to RFID, but is by no means only restricted to that technology. Consequently, any system which requires an entity (e.g., transmitter) to alert another entity (e.g., reader) applies to this idea without regard to the medium used (e.g., RF, IR, cable, etc).

Within Class-3 (and higher Class) tags, preserving the battery life by segregating which devices are activated will also help in power management. Selection criteria used to activate or power on only those tags for which communication is necessary will preserve, as best as possible, battery life. In selections of a subsets of tags which reside in the field for the e.g., Class-3 mode, tags may be selectively activated, then accessed, then placed back into their hibernate (or other low power) state, and the next set of tags selectively activated. Enabling an activation selection process for large quantities of resident tags in the field at one time, but less than all tags in the field at one time, provides for the best power management strategy.

In order to reduce current draw and increase the life of battery resources, an activation or "activate" command is used. This activate command according to a preferred embodiment includes three parts. The first part is clock synchronization. The second part is an interrupt (also known as a violation). The last part is a digital user activate command code. These three parts conceptually create the activate protocol. These steps must be sufficiently separated in combination from "other normal" or common traffic as to be able to decipher the activation command from other commands or noise in, for example, Class-1, Class-2 or Class-3 devices. Each of these three components is described as follows in conjunction with FIG. 3A. It should be kept in mind that the numbers of bits, number of cycles, frequencies, memory locations, etc. can vary from those used for illustrative purposes below.

The activate scheme described herein is also useful in all RF devices with or without batteries for the purpose of selectively selecting individual or a subgroup of particular devices.

The basic features of the "Activate" command 300 are a:
Clock spin-up or synchronization section 302;
An interrupt 304 to synchronize the start of a command with sufficient difference from "normal" commands (such as a timing violation in the forward communications protocol, or a "cluster" of bits that the device recognizes as an interrupt);
An activate code 306 to allow potentially selective, subset of all, or all-inclusive activation.

Circuitry and a description of each phase of the command 300 are set forth below in further detail; however, the basic principles are presented now in summary form.

When at an initial starting point, or not in active mode, all devices will "listen" to incoming signals for the activate command. It is desirable that very little power be consumed in listening for the active sequence. Power consumed is directly related to battery life (and thus potentially device life). As the activate command is received and processed, portions of the circuit may activate as more of the activate command sequence is completed.

The Clock Sync portion 302 of the Activate command 300 preferably includes a predefined clock synchronization signal at an incoming rate of, for example, 8 KHz. There needs to be a sufficient number of clock cycles to allow the receiving tag to recognize and synchronize to the incoming stream. The number of incoming clocks to the tag is preferably not less than 4 cycles and not greater than 10 cycles, but could be greater or smaller.

The next section is the Interrupt or violation section 304. This preferably includes two cycles of 50% duty cycle based on a 2 KHz incoming rate. The interrupt marks the beginning of the code section which is the third component of the Activate command. By observing the interrupt portion 304, the receiver (tag) will realize that it has received an "Activate" command. Correct reception of the interrupt portion 304 moves the tag from the hibernate state into the code search state. A device (tag) preferably will only stay in the code search state for a maximum time period, such as 1-5 ms, preferably 2 ms. If the tag is not moved into the ready or active state within that time, the tag will automatically revert back into the hibernate state.

The receiving device listens for the interrupt, in this example a logic 1-1 in sequence. Upon encountering any logic 1-1, the device then processes the incoming activate code 306 as described below. If a value in the next sequence of bits matches a value stored locally on the receiving device, the device wakes up (as described below). If one of the bits in the sequence fails to match, the device resets, looks for the next interrupt, and begins monitoring the sequence of bits after the next interrupt (here, logic 1-1). It should be noted that a logic 1-1 in the activate code portion 306 may cause the device to begin analyzing the incoming bit stream again. However, the code will not match and the device will reset again. So while one practicing the invention can select codes that do not result in unintended analysis, occurrence of unintended analysis should be rare. Note that codes can be predetermined that avoid unintended analysis can be predetermined and assigned. The same would apply to the bits preceding the correct interrupt.

The activate code portion 306, according to one embodiment, can be described in two parts: first the signaling or communications protocol, and second the command protocol. Signaling can best be described as two different frequencies where a zero is observed as a 2 KHz tone and a one is observed as an 8 KHz tone. These two tones (otherwise described as FQF for frequency, quad frequency) describe a command, which when matching an internal register, move the tag from a hibernate state to an active state (ready state in the state machine). The activate code segment is composed of several strings of data. This packet 306 is shown in FIG. 3B.

Figure 3A:
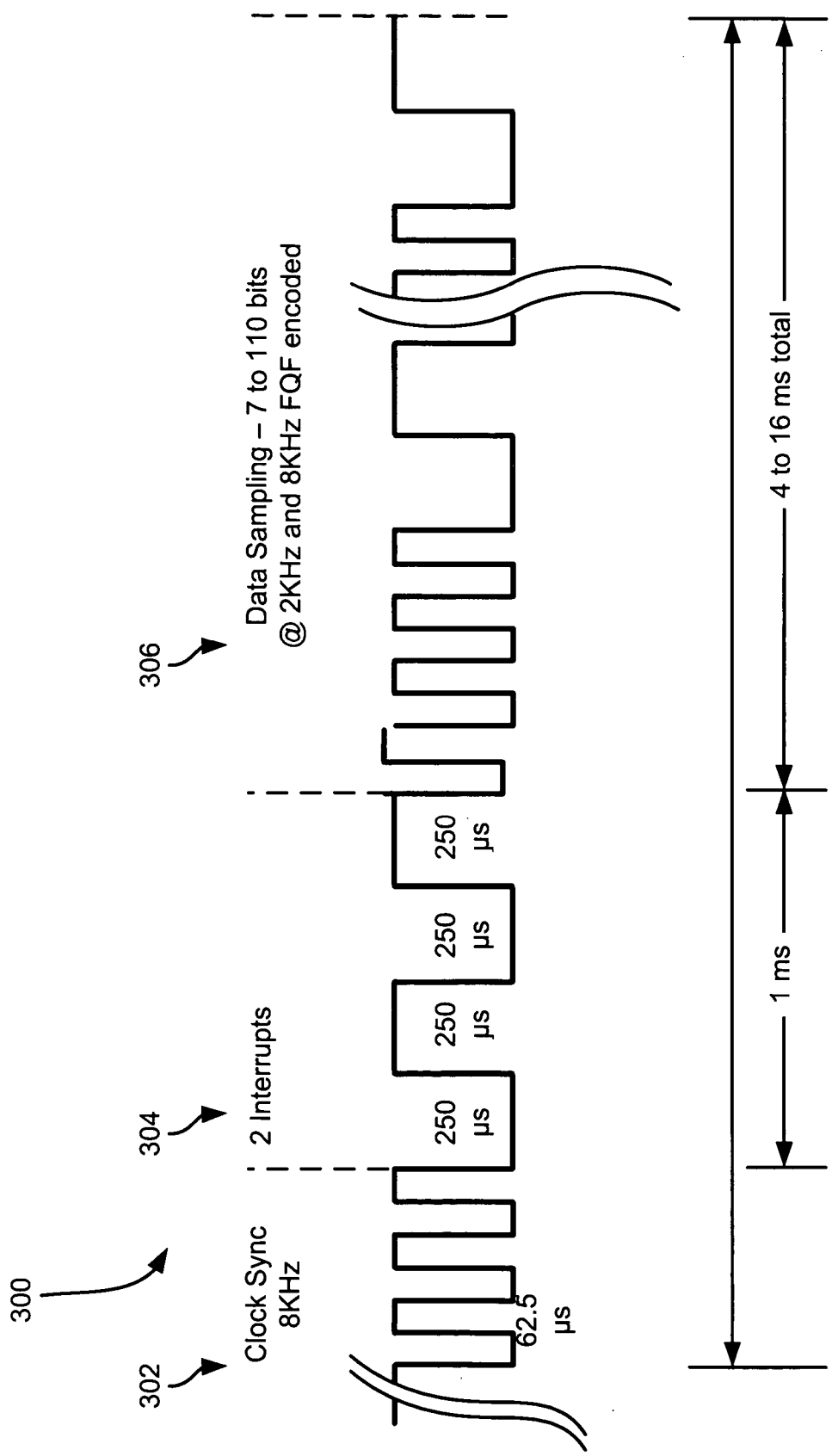
FIG. 3A is a depiction of an activate command according to one embodiment.
Figure 3B:
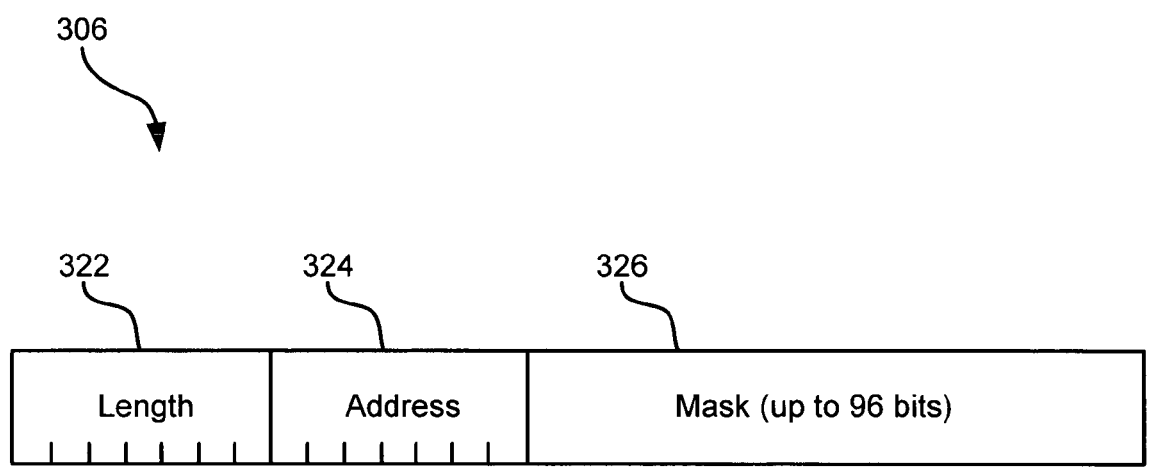
FIG. 3B is a depiction of an activate code according to one embodiment.

As shown in FIG. 3B, the three components are (in order of reception at the tag) Length 322, Address (optional) 324, and Mask 326. Each component is described in detail below. Again, specific values are used below only for illustrative purposes, and are meant to illustrate a functional embodiment. One skilled in the art will appreciate that values and bit lengths can be increased or decreased depending on his or her preferences and in consideration of regulatory requirements. Thus, the size of the overall command is variable. Additionally, the Length 322 and Address 324 positions could potentially be switched, i.e., the Address 324 would be received before the Length 322. Other variations could include additional fields not shown in FIG. 3B, such as a terminator value (e.g., logic 1-0-1-0) indicating the end of the Length 322 or Address 324 fields.

The length field 322 in this example contains seven bits. In this example, the length field 322 may contain length values from, for example, zero to $2^7$ (or 128). The length value specifies the length of the Mask field 326 from zero bits up to and including the maximum length of the Mask field 326, thereby specifying the position of the final bit of the mask value in the Mask field. In this example, the maximum mask length is 96 bits. The length field 322 is used in conjunction with a user defined minimum mask length register (MML register) on the receiving device (tag). The MML register at a specified location (for example, User Memory; 0x0000) controls the minimum value which can be used for the length field 322. The minimum mask length register is the minimum amount of bits necessary to match a mask from a given starting point. If a value of length field 322 is less than the MML register, the tag will ignore the rest of the activate code 306 and will stay in the hibernate state. If the MML register is set to zero, than the length field 322 of the activate code 306 may also be set to zero. In a variation, the mask length register may define a maximum or exact value against which the value of the length field 322 is compared. In another variation, the length field 322 may indicate the length of the mask value in the mask field, where the address field 324 indicates where the length begins.

A zero (or other predefined) value in the length field 322 may act as a match for all devices in the field. Values of length which are greater than the maximum mask length (e.g., 96) causes the activate packet to be ignored and thus, the tag returns back to the hibernate state. In the case of a zero length value, neither the address nor mask fields will exist, thereby reducing the activate code to a seven bit field of value zero. If a value of zero is observed in the length field and the MML register allows a zero value for the length, then all devices may transition from the hibernate state to the active ready state without regard to the address or mask fields. In practice, the address and mask fields might not exist if a legal value of zero is found in the length field.

The address field 324 is optional, and in this example is also a 7 bit field. It is used in conjunction with the mask field 326 to provide an offset into the 96 bit memory reserved for the mask. If the length is set to 96, a zero offset for address is assumed, thus, no address field will be observed. For values of length less than 96, the address can be used as an offset applying the mask value received in the mask field 326 to align with the data stored in the internal mask register. In other words, the relevant mask value in the mask field 326 may begin somewhere other than the beginning of the mask field. If the combination of the length field and the address field result in an overflow (an ending value greater than the size of the 96 bit internal mask register), the tag stays in the hibernate state, ignores the rest of the incoming activate code 306, and waits until a new activate preamble is received.

The mask field is compared against the internal activate mask register using the length and address as the number of bits to compare and the beginning offset to start the comparison. The internal activate mask register is located, for example, at (User Memory; 0x30). The received mask value of the mask field is compared on a bit for bit basis. If the bits of the received mask value match the internal activate mask register, the tag will transition from the hibernate state to the active ready state. If a roll-over condition exists, that being the length of comparison has not been exhausted before the $96^{th}$ bit of the mask has been compared, the tag will interpret this as an error condition and ignore the rest of the incoming activate packet, and stay in the hibernate mode. An example of this could occur if the address indicates mask field bit 90, and the length field indicates a mask of 10 bits. Because the mask field ends at 96 bits, the comparison rolls over the end of the mask after comparing 6 bits, and the process fails.

Alternatively, instead of failing on rollover, the mask can be circular. If the address and length fields cause a rollover, the comparison of mask bits continues by starting at the first bit of the mask. An example of this could occur if the address indicates mask field bit 90, and the length field indicates a mask of 10 bits. Because the mask field ends at 96 bits, the comparison rolls over the end of the mask, so the comparison continues at the first mask bit and to the fourth mask bit. Thus, the comparison is performed in a circular manner.

Note that the mask field can also include "dummy" bits following the mask value. Because the portion of the mask field that needs to be compared to the activate mask register is defined by the length and address sections, any additional bits following that portion have no effect on whether the device activates or not. This would allow such things as activate codes for different tags to all have a common length.

The activate code can be initially set at manufacturing, or can be programmed layer, such as at tag initialization. In either step, device passwords can be set to restrict access to certain functions or memory locations of the tag.

Some or all of the components of the activate code: Length 322, Address 324, and Mask 326 can be made programmable by users at any stage in the tag's life, including those above and post-initialization. Preferably, only authorized users (including people, software, and machines) are able to modify the activate code. Authorization can be determined by presenting the proper password. Further, the extent that changes can be made may vary from user to user. For instance, different passwords may allow different levels of authorization, from very limited functions to full access and ability to change anything on the tag.

Embodiments where the length field value is definable by the user are advantageous as they provide great flexibility for operations across various industries. For instance, in a dock door scenario where tags are moving quickly past the reader quickly, a short length may be desirable. In a pharmacy or financial situation where privacy and security concerns are paramount, a longer length provides greater security. Similarly, in a noisy or harsh environment, a shorter code may be desirable as there is less chance of a bit being unrecognized due to noise. The longer the transmission, the more chance it will be corrupted by noise or environmental effects. The user, knowing the security model and the environments the devices will be used in, can set the length, address, and/or mask to what is situationally appropriate. Further, these values can be changed as the device travels through the supply chain, thereby providing even greater flexibility. The length, address, and/or mask values can also be locked, requiring a password to change them. Accordingly, the disclosed embodiments of the invention provide enhanced security, as the tag cannot even be communicated with unless the tag is woken up.

Note that the activate command 300 can be sent several times to ensure that the code tag activates. Also, several different activate commands can be sent consecutively to activate multiple tags.

An advantage of the activate command 300 of FIG. 3A is that, instead of sending signals of various symbols (e.g., 2, 4, 5 and 8 KHz), only two symbol signals are used. In this example, the symbols are 2 KHz (logic 1) and 8 KHz (logic 0). The 2 KHz symbol is also used in the interrupt.

Because only two symbols are being used, the circuitry can be much simpler. In fact, no clock synchronization is needed. This also reduces the power requirements. Similarly, operation is more robust, as it is easier to distinguish between two symbols as opposed to four. One tradeoff is that not all possible combinations of 0s and 1s can be used. However, the number of available combinations is more than sufficient for most if not all potential applications.

An additional advantage is that the incoming signal can be asynchronous. In other words, by clocking on the falling (or rising) edge, the device can read asynchronous stutter clocking of data. Because shorter periods (e.g., 8 KHz symbols) can be followed immediately by the next data signal, the overall signal is more time efficient. For instance, four 8 KHz symbols (four 0s) fit within the same time period at one 2 KHz symbol (a single 1). Further, by using four-to-one, no adaptive oscillator is needed, eliminating the need for much of the additional circuitry that would otherwise be required. This also preserves the 50% duty cycle.

In operation, the signal can be sent as a continuous stream. An 8 KHz stream of a repeating pattern (of 0s) or other selected series can be sent to allow the device to center the signal.

Figure 3C:
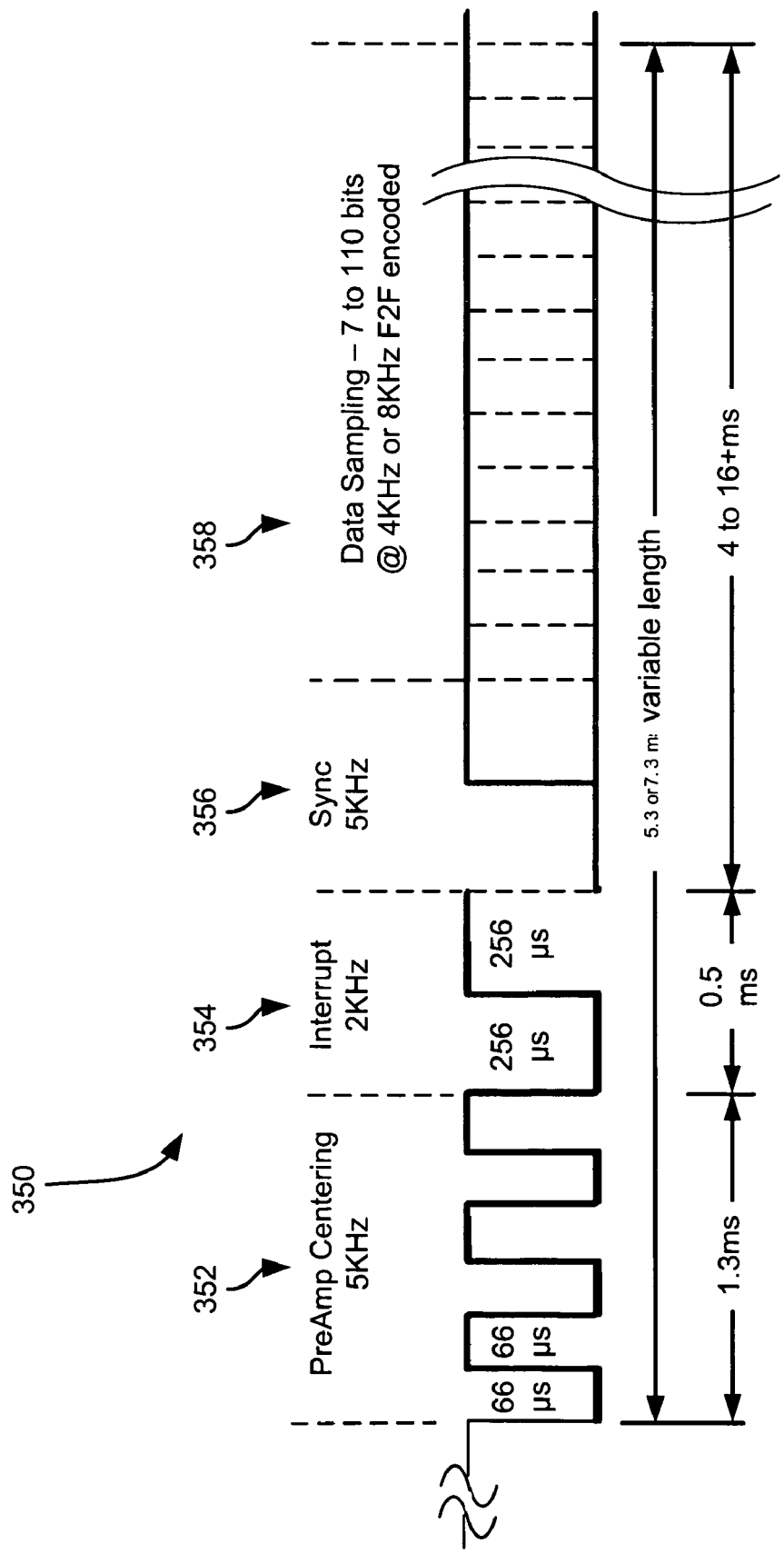
FIG. 3C is a depiction of an activate command according to another embodiment.

FIG. 3C shows a structure of an activate command signal 350 according to another embodiment. The four sections are shown as: PreAmp Centering 352, Interrupt 354, Synch 356, and Data Sampling 358.

First a preamplifier centering sequence (PreAmp Centering) 352 is received by the device. This centering preferably includes a number of 6 KHz 50% duty cycle wave forms. Again, the use of a 6 KHz tone is specific to the preferred method and does not represent all possible synchronization methods. This centering is used to interpret all subsequent commands for this period. By sending "some number" of pulses, the receiving device (tag) has sufficient time to adjust its sampling threshold point. This will allow the receiver to distinguish between logical high and low values (ones and zeros).

The next sequence is the interrupt period (Interrupt) 354. This preferably includes one 2 KHz 50% duty cycle wave form.

The next sequence is a synchronization signal 356, which is used to synchronize an adaptive timing circuit. Here, the timing circuit is not activated until the device detects the proper interrupt period 354. The timing circuit can then use the synchronization signal 356 to set the period. In this way, the device oscillator (if present) does not need to be constantly running in order to be properly calibrated.

The device should then turn its attention to decoding a subsequent received field, the digital activate code (Data Sampling) 358.

The digital activate code 358 is a 50% duty cycle signal (+/−10%) based on a F2F modulation protocol which will allow the transmitter (reader) to select which populations of receivers (tags) it wishes to activate in a Class-3 mode. The activate code is shown as 7-110 bits. A mask field 326 value of 16 bits allows for $2^{16}$=65536 possible code values. The actual number of possible codes is preferably reduced by one; the 0000(hex) value is preferably used to select all devices regardless of the pre-programmed activate code.

One skilled in the art will appreciate that the following circuitry will function with a signal as described with reference to FIG. 3A.

Signals such as those shown in FIG. 3C may require additional device components, such as a VCO, clocking section, data slicer, and/or DAC. A device that can process the signal of FIG. 3C is described in copending U.S. patent application Ser. No. 11/007,973 filed Dec. 8, 2004 with title "BATTERY ACTIVATION CIRCUIT", which is herein incorporated by reference.

Figure 4:
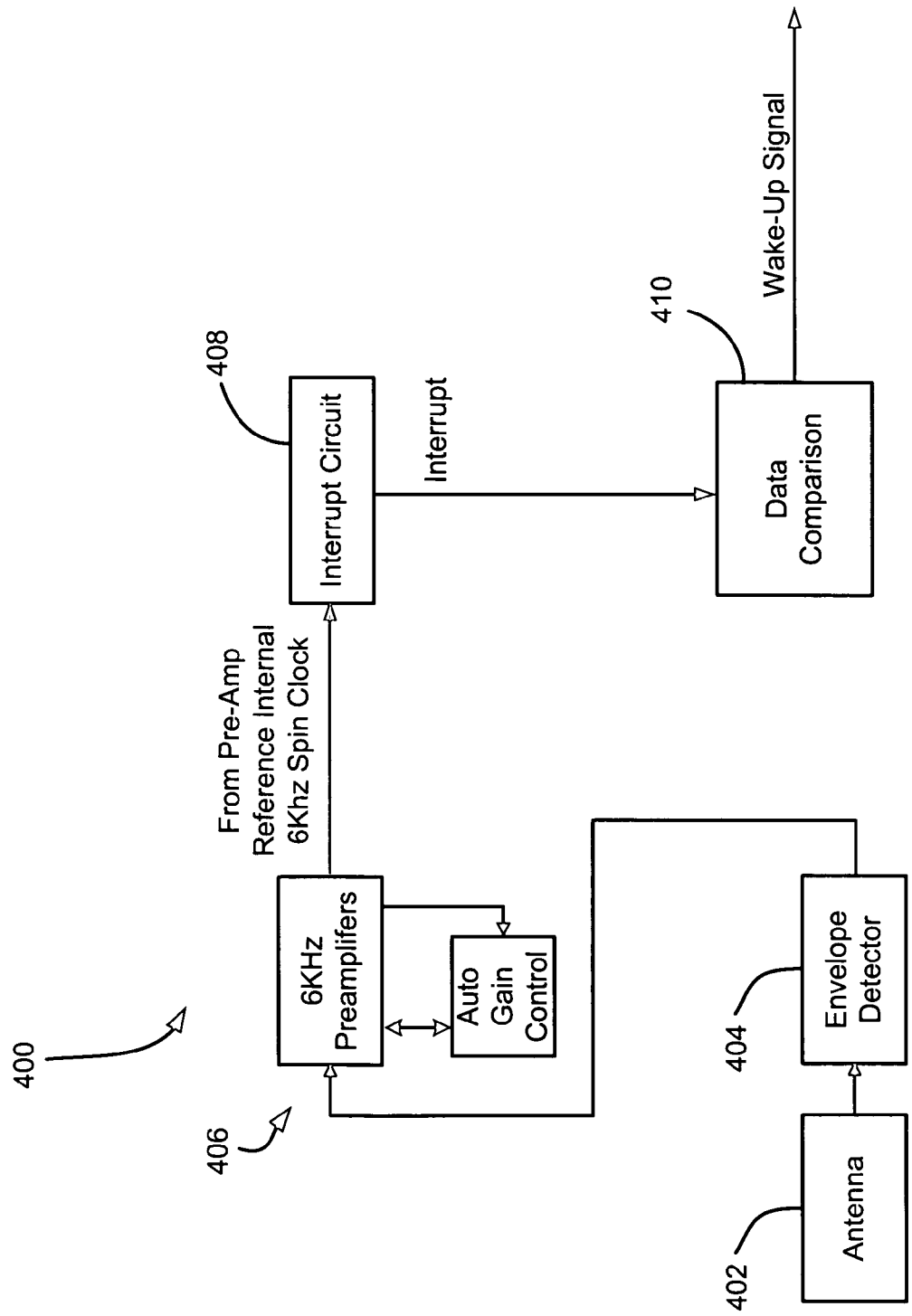
FIG. 4 is a diagram of an activate circuit according to one embodiment.

The block diagram of the system 400 used to implement a preferred method of the activate function is shown in FIG. 4. The system 400 is found on the front end of an RFID tag device (or other device). The incoming signal is received by the antenna 402 and passed to an envelope detector 404. The envelope detector 404 provides band pass filtering and amplification. The bias of the amplification stage 406 is also set during the clock tuning phase. The preamplifier and gain control of the amplification stage 406 may have a self-biasing circuit that allows the circuit to self-adjust the signal threshold to account for any noise in the signal.

The next several sections deal with collecting this filtered and amplified signal, and trying to match the incoming information to the activate command. In the interrupt circuit 408, observation of incoming information is compared to the interrupt period to match the observed signal to the required interrupt period. If successful, an interrupt signal is sent to a data comparison section 410, alerting it of an incoming digital activate code. The data comparison section 410 is used to observe the activate command and compare the received value to the tag's stored value. If the values match, the tag (device) is sent a "wake-up" signal, bring the tag to a fully active state (battery powered).

The subsequent circuitry makes use of "current mirrors." In examining the function of a current mirror, it is used to limit the amount of current draw in an operation or logic function.

Figure 5:
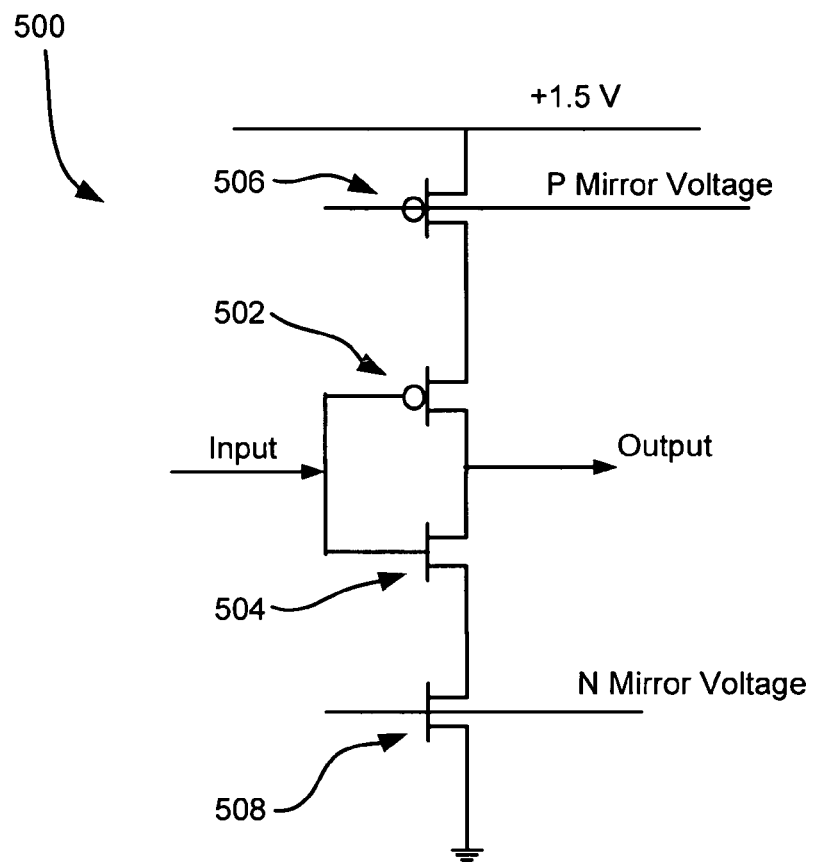
FIG. 5 is a circuit diagram of a mirror inverter according to one embodiment.

FIG. 5 shows a use of the current mirrors 500 to create a low power inverter. A current mirror is a device used in integrated circuits to regulate a current; to keep it constant regardless of loading. The center two transistors 502, 504 comprise a typical inverter. By placing a logical one or high voltage on the input, the bottom transistor 504 is placed into the active region and drives the output signal to a logical 0 or low voltage level. If a low voltage (logical 0) is placed on the input signal, the top transistor 502 will turn on, thus, driving the output signal to high (logic 1). A problem exists when switching from turning on one transistor and turning off the other, in that both transistors are on for a moment, which drive the current to ground. This is a big current drop, and will use large amounts of battery power.

By adding the current mirror principal, two additional transistors 506, 508 are used to limit the amount of current which travels thought the inverter.

Figure 6:
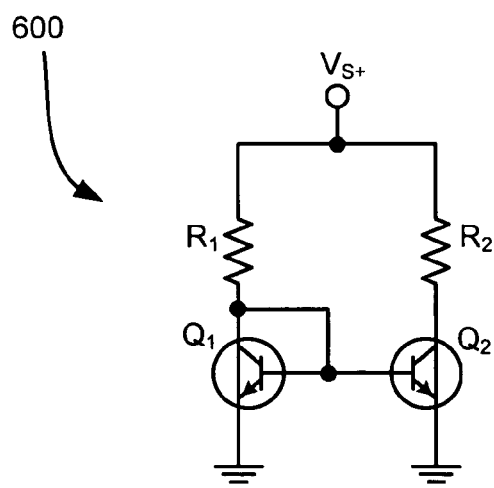
FIG. 6 is a circuit diagram of an exemplary current mirror according to one embodiment.

FIG. 6 illustrates an exemplary current mirror 600 according to one embodiment. From FIG. 6, transistor $Q_1$ is connected such that it has a constant current flowing through it; it actually behaves like a forward-biased diode, and the current is determined by the resistance $R_1$. It is important to have $Q_1$ in the circuit, instead of a regular diode, because the two transistors will be matched, and thus the two branches of the circuit will have similar characteristics. The second transistor $Q_2$ changes its own resistance so that the total resistance in the second branch of the circuit is the same as the total resistance in the first branch, regardless of the load resistor, $R_2$. Since the total resistance in each branch is the same, and they are connected to the same supply, $V_{s+}$, the amount of current in each branch is the same.

The value of $R_1$ can be varied to change the amount of current going through $R_2$. Since $R_2$ can change dynamically, and the current through it will stay the same, the current mirror is not only a current regulator, but also can be thought of as a constant current source, which is the way it is used in integrated circuits.

Figure 7:
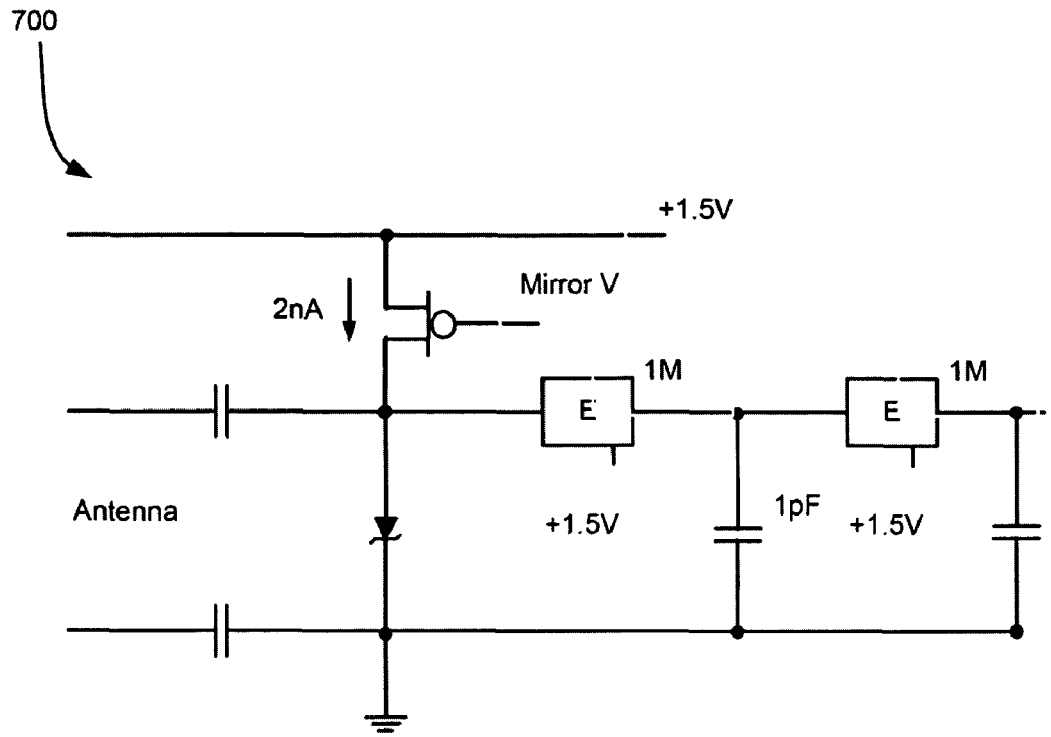
FIG. 7 is a circuit diagram of the antenna and envelope detection sections of the activate circuit of FIG. 4 according to one embodiment.

The first piece of the protocol is the antenna and envelope detection sections 402, 404. This circuit 700 is shown in FIG. 7.

Figure 8:
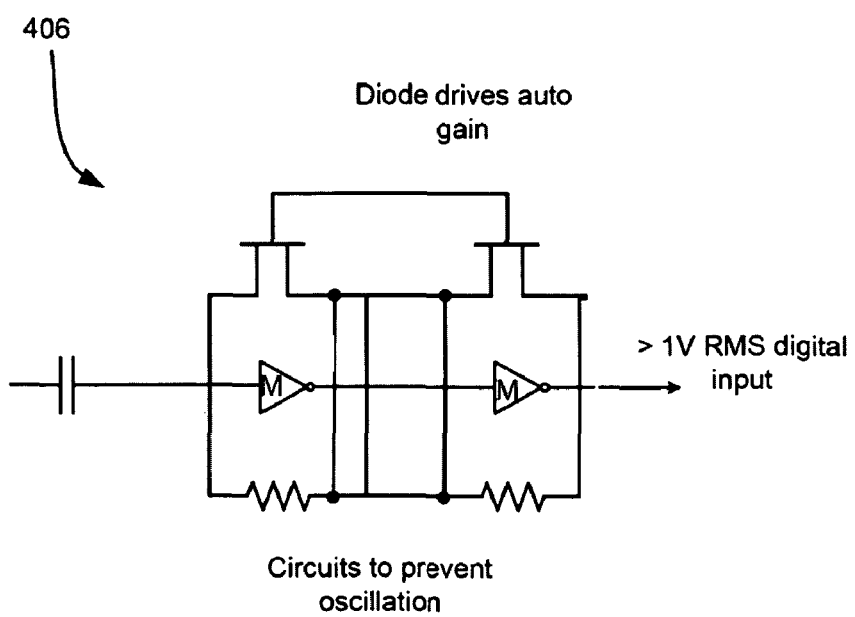
FIG. 8 is a circuit diagram of the self-biasing pre-amplifier of the activate circuit of FIG. 4 according to one embodiment.

There are several parts to this circuit 700. Two items of interest come from the antenna 402: the first is the signal where the information exists and second is the RF radiated power. Radiated power is dealt with separately. The information (signal) is then filtered by a low pass filter. From this section the signal is sent to the amplification and self biasing circuit 406 shown in FIG. 8.

Figure 9:
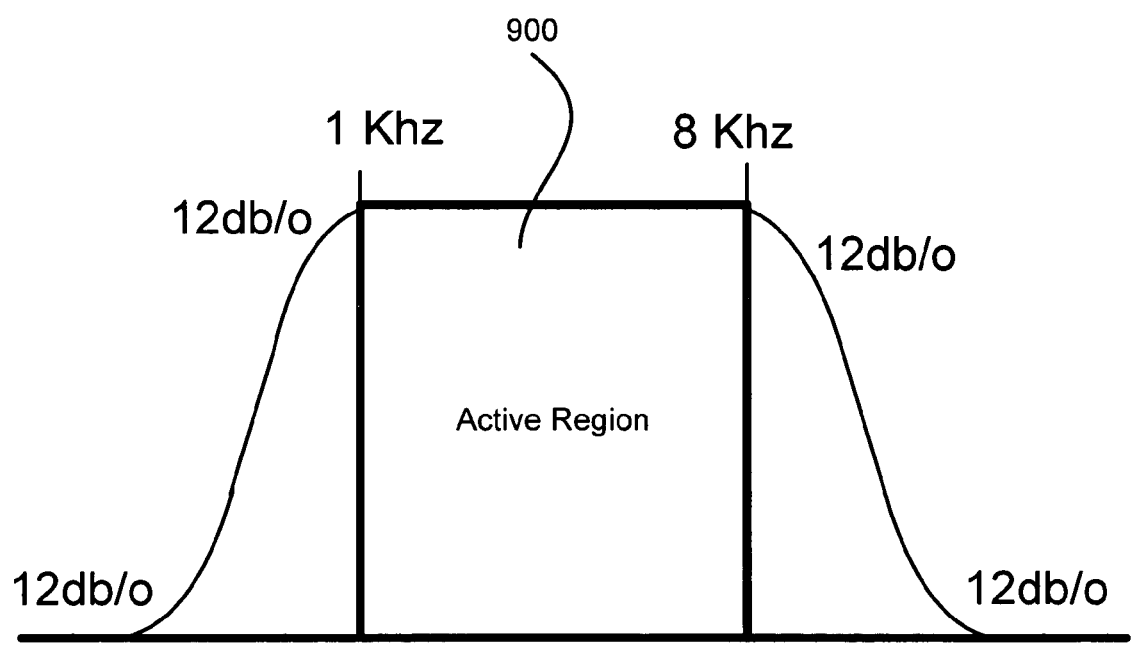
FIG. 9 illustrates a band pass region of a signal filtered by high and low pass filters of the activate circuit.

The first portion of this circuit 406 is a high pass filter. This in conjunction with the previous stage low pass filter creates a band pass filter. Shown in FIG. 9, this band pass region 900 is approximately 7 KHz with a 12 db/octivate drop off on either side. This band pass filter is used to exclude most of the unwanted noise.

The merits of this two stage amplifier allow for a tuning and self biasing of the output signal. A signal will enter from the left hand side of FIG. 8 and be filtered by the capacitor resistor (RC) circuit. This allows filtering of unwanted signals (high pass). The signal then goes into the op-amp design, which due to the feedback configuration will allow for self biasing. The noise associated with background may cause the bias point to move from an optimal position to a point far out of range. Because the signal is a 50% duty cycle waveform (50% high and 50% low), the threshold will move towards the average value, centering itself at the desired bias point. If noise is received, the resistor bleeds off some of the signal. By forcing the duty cycle to 50%, the DC level will always seek a midpoint between two signals, causing it to center itself on the received signal, regardless of the amount of noise or strength of the signal. And though unwanted noise may indeed fall into the range allowed by the band pass filter, noise will not exhibit the characteristics of a 50% duty cycle wave form. If the waveform is not 50%, the bias point will eventually move towards the appropriate level.

If a noise signal is received such that the amplifier receives a very unbalanced high voltage non-50% duty cycle, the bias point will move to a higher input voltage (the equivalent argument exists for the opposite condition and a lower input voltage). In this case where a "real" signal which exhibits a 50% duty cycle within the band pass filter range is presented to the input of the pre-amp, it may have a different voltage threshold. By allowing several cycles to occur, the 50% duty cycle will adjust the bias point, dropping or raising the voltage level to accommodate the "real" signal as opposed to the "noise" signal (background, interference, or otherwise). The output of the pre-amp should be a 1V root means square (RMS) digital "input" to the next sections. These two sections are the interrupt circuit and the activation code circuit.

At this point, the threshold has been set. Now, the interrupt needs to be identified.

Figure 10:
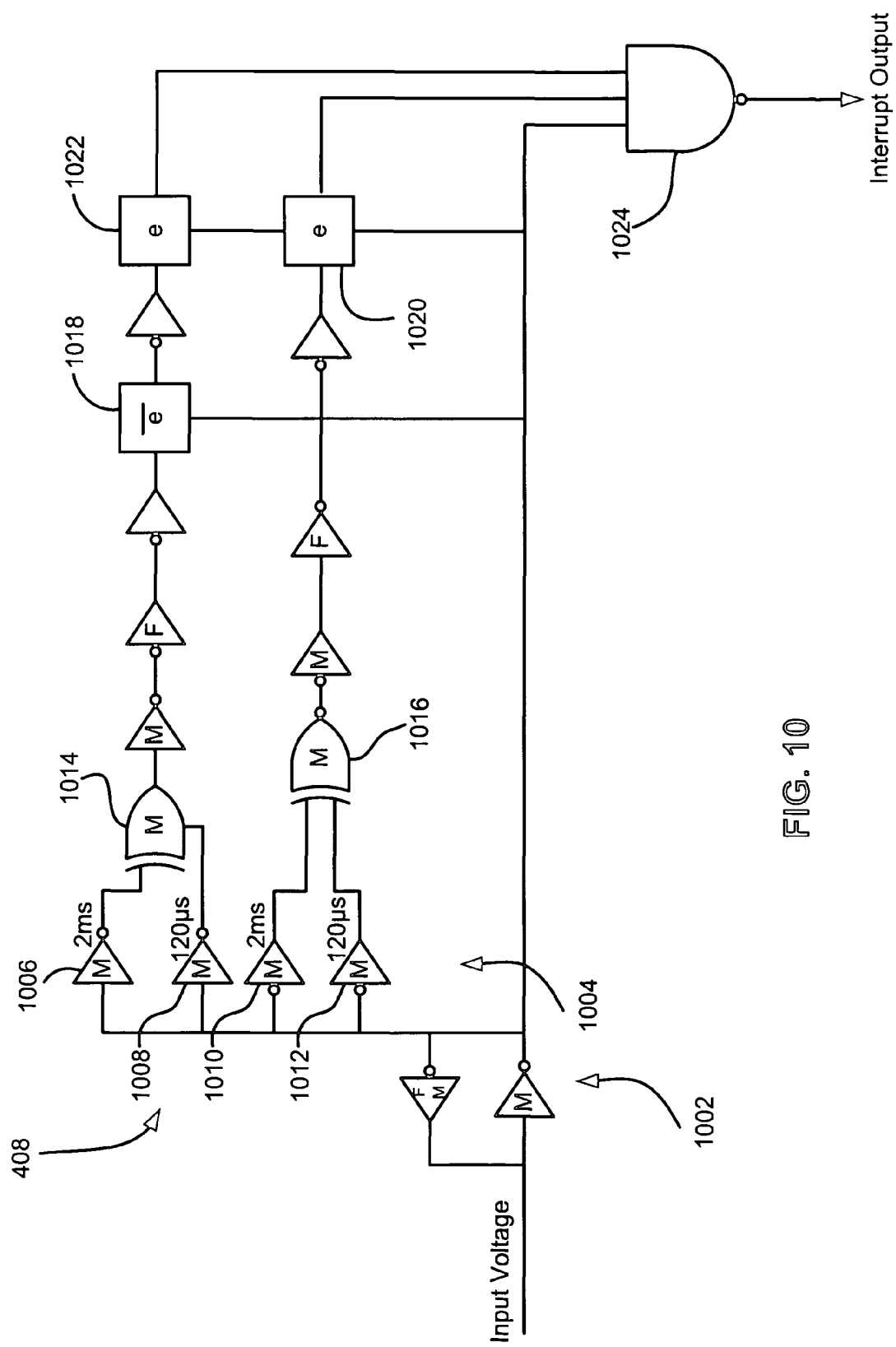
FIG. 10 is a circuit diagram of the interrupt circuit of the activate circuit of FIG. 4 according to one embodiment.

An interrupt circuit 408 according to one embodiment is shown in FIG. 10. This circuit 408 detects an interrupt having a specified low period and a specified high period. If the low and high periods fall within a prespecified range, the overall circuit 400 knows to look for the activate code.

The output of the pre-amplifier 406 comes into the left hand side of the interrupt circuit 408 shown in FIG. 10 as the digital input voltage. It is then passed through a weak feedback latch 1002 which will hold the digital value until the input changes. The next section (of mirror invertors) 1004 matches the low and high period times associated with the interrupt period. This interrupt period corresponds to the second section of the activate command preamble.

Each of the parallel equivalent sections contains two inverters 1006, 1008, 1010, 1012 which limit by delay the period of the high and low period of the interrupt interval. The upper half of the circuit captures or matches the low period of the interrupt pulse, and the lower half captures the high period of the pulse. Both portions of the diagram show a 120 µs and a 2 ms bounds to the signal. This occurs via the matched mirrored inverters 1006, 1008, 1010, 1012. Each of these inverters 1006, 1008, 1010, 1012 contains a current mirror to limit current drain. Each of these inverters 1006, 1008, 1010, 1012 is "tuned" for specific delay timing. One inverter (in each half of the circuit) is tuned for 120 µs and the other is tuned for 2 ms. This allows matching of delays between these intervals. The interrupt interval is nominally set for 256 µs, which is a period timing between 2 ms and 120 µs; that being a pulse interval of 256 µs with a tolerance of −135 µs to +1.74 ms.

The mirror inverters 1006, 1008, 1010, 1012 are similar to that shown in FIG. 5. However, to achieve the desired long delay timing (e.g., 2 ms), several unique features are provided. The channel width of the P-side transistor (502 of FIG. 5) is reduced to minimum (e.g. 0.6 µm). The channel length of the P-side transistor is extended (e.g., 20 µm) to further reduce the current passing therethrough. The current is slowed even more because the long channel length increases the threshold, making it harder to turn the transistor on. Additionally, the transistor is more capacitive due to its size, slowing the signal even further. To further extend the timing delay, mirror transistors (506 and 508 of FIG. 5) are added, which are driven by mirror voltages. The mirror transistors are also asymmetrical, the P-side mirror transistor having channel dimensions similar to the P-side transistor. However, the P-side mirror transistor is set to be only 10s of mV above the threshold. Note that the N-side mirror transistor (508 of FIG. 5) is optional, as the N-side transistor (504 of FIG. 5) is a full-size device and so switches quickly.

Because the mirror inverters work as timing circuits, they have a very large capacitance, and the signal consequently is in the fault zone for a long time, i.e., ramps very slowly. To sharpen the edges of the now bounded or filtered signal, the output of each inverter 1006, 1008 on the top half goes into an exclusive OR (XOR) gate 1014 and then passes through several stages of inverters to arrive at a pass gate 1018. Each "stage" sharpens the edge of the signal a little more, amplifying and cleaning up the signal to provide a signal with a rapid transition time. Note that an M indicates a mirror inverter, while an F indicates a fast mirror inverter.

The same process is true for the high period on the lower half of the figure. The high period bound then passes again though an XOR gate 1016 through several inverters and arrives at a pass gate 1020. Both the upper and lower pass gates 1018, 1020 are used as latches. The one difference is that the upper path has an additional pass gate 1022, to allow for a shift register approach to synchronize timing and order. Since the low time precedes the high time by half a clock period, the low valid signal must be held for this additional time to align with the high period valid signal. The exclusive OR gates 1014, 1016 are used to select the active potion of the interrupt protocol. Since the timing of valid periods falls within the 120 µs to 2 ms period, the outputs of the mirrored inverters 1006, 1008 will activate the output of the XOR gate 1014, driving it true. This signal in turn is captured with the correct polarity by the pass gate 1018 used as a latch for synchronization. If the sequence of the interrupt protocol is "valid", then the output of the logic (e.g., NAND) gate 1024 will go low, thus, signaling that an Interrupt output has occurred. The logic gate 1024 has five inputs: the four outputs from the mirrored inverters 1006, 1008, 1010, 1012 and the output from the feedback latch 1002.

Figure 11A:
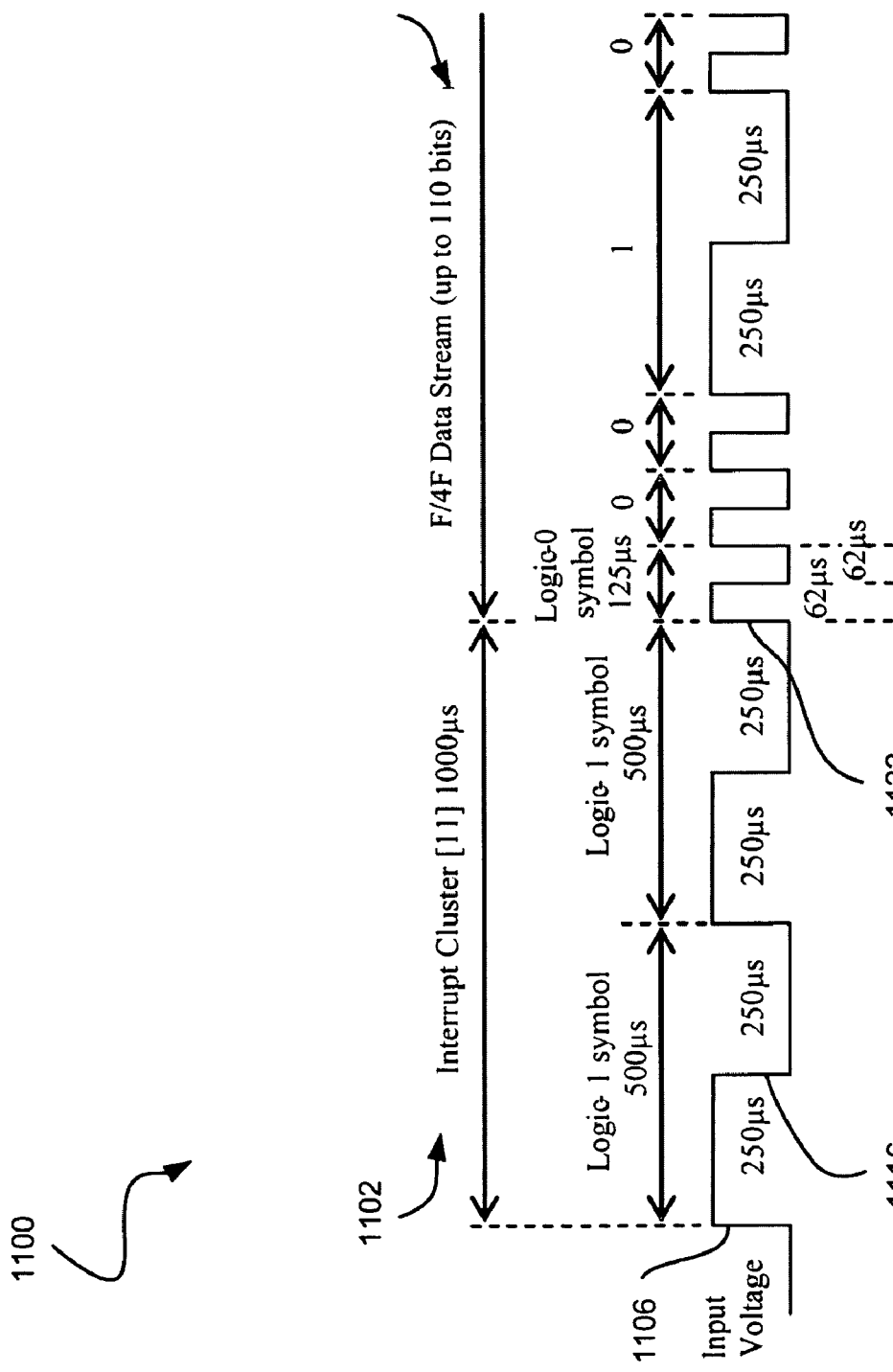
FIG. 11A is a depiction of an activate command according to an embodiment.
Figure 11B:
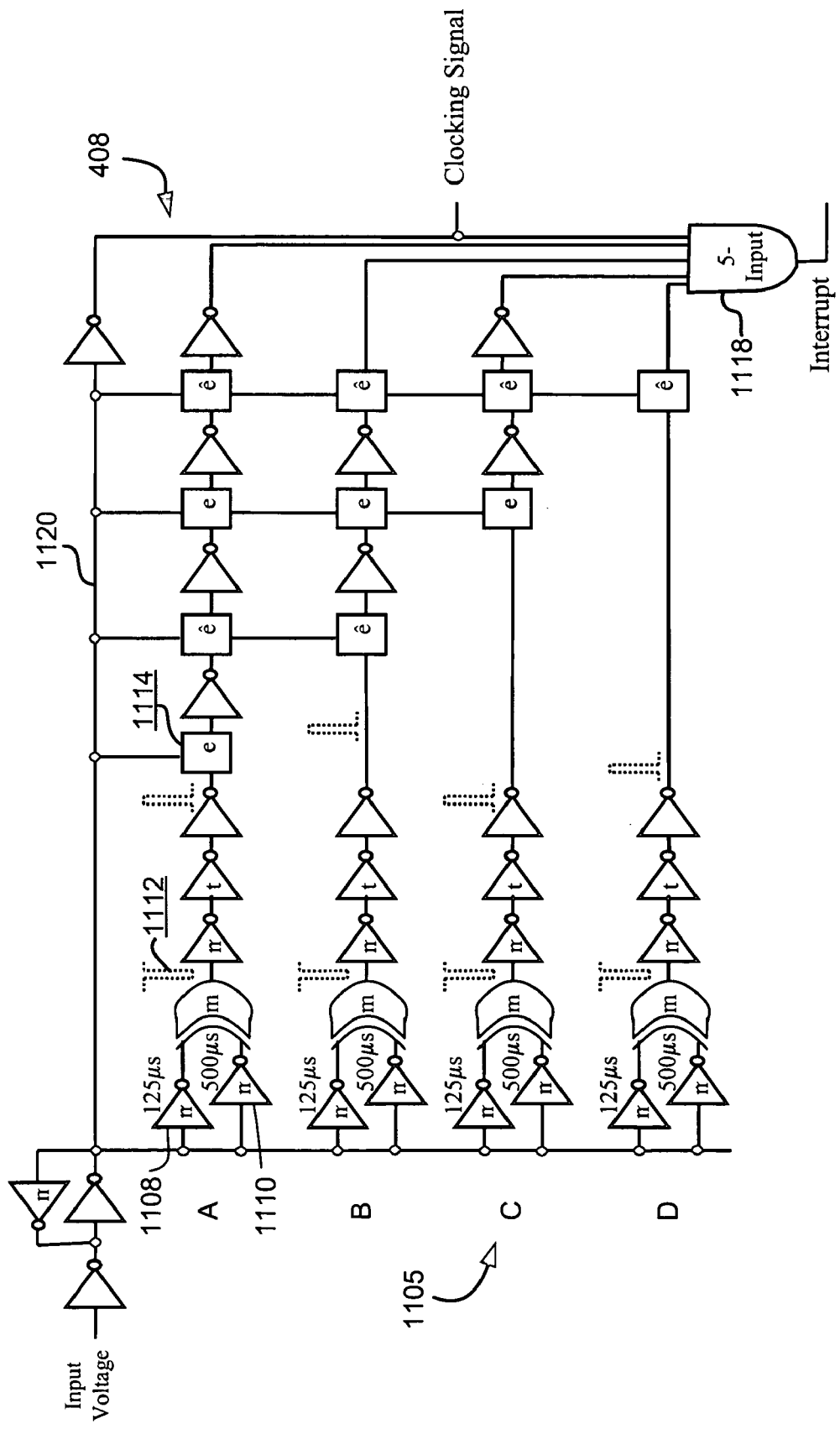
FIG. 11B is a circuit diagram of the interrupt circuit of the activate circuit of FIG. 4 according to one embodiment.

FIGS. 11A-B depict another illustrative embodiment of the interrupt circuit 408. This interrupt circuit 408 detects an activate command signal similar to that shown in FIG. 3A. In this circuit 408, four (or more) data paths are present to detect an "interrupt cluster" in the incoming signal, where the interrupt cluster is a series of symbols that the circuit recognizes as an interrupt. Here, as in FIG. 3A, the interrupt cluster is a data 1-1. Again, upon detecting the proper interrupt cluster, the circuit will then compare the subsequently received activate command and compare it to a value stored in the device.

Regarding the activate command signal 1100 shown in FIG. 11A, it is preferred that the activate command portion 1104 of the signal 1100 not contain any sequence of two consecutive 1's. In a 16 bit code 1104, about 1 million combinations are possible. In a 32 bit code 1104, there are about 4 billion possible combinations. In a 110 bit code 1104, there are tens of billions of possible combinations. It follows that there should be enough possible combinations of bits not having consecutive 1's for most or all possible uses of the activate command 1100.

With reference to FIG. 11B, the first part of the circuit is an interval detection circuit 1105 that detects the interrupt cluster. Data path A detects the first rising edge 1106, as shown in FIG. 11B, of the interrupt cluster. Following the delay times (250 μs and 1 ms) the mirror inverters 1108, 1110 respond to the rising edge 1106.

The first mirror inverter 1108 responds to the first rising edge slowly, e.g., in 256 μs. The second inverter takes even longer to respond, e.g., 1 ms. The two acting together create a negative pulse 1112 (due to the inverter) in response to the positive clock edge 1106. The pulse goes low and lasts 250 us to 1 ms. The information, once initially sampled, is clocked like a shift register through the remaining logic. In this embodiment, the data passes through several logic a latch, e.g., first enabling gate 1114 drops at 500 μs to capture a logic 1. The signal then passes through additional latches, inverters, and registers to finally arrive at a logic AND gate. The other latches in data path A respond similarly to the first latch 1114, except that those with "ê" capture data on the falling edge.

Data path B functions in substantially the same way as data path A, with the exception that the mirror inverters respond to the first falling edge 1116. Another difference is that data path B has fewer logic elements, as the edge 1116 it responds to is later in time.

The same is true for data paths C and D. The net result is that the signal from each data path arrives at the interrupt gate 1118 (AND gate) at the same time.

If the interrupt cluster is proper, all of the inputs into the interrupt gate 1118 are 1's, including the input along line 1120 (as resulting from rising edge 1122). When all 1's are input into the interrupt gate 1118, the interrupt gate 1118 outputs an interrupt signal.

It should also be noted that the circuit 408 is self clocking. Line 1120 provides a clocking signal to the counter 1524, which uses the input voltage as the clocking signal.

Thus, both circuits 408 shown in FIGS. 10 and 11B are self clocking circuits (as no clock is present). Accordingly, two methods have been shown how to detect an interrupt without requiring a clock signal be present. One skilled in the art will understand that other circuit designs can be used to implement the various embodiments.

Figure 12:
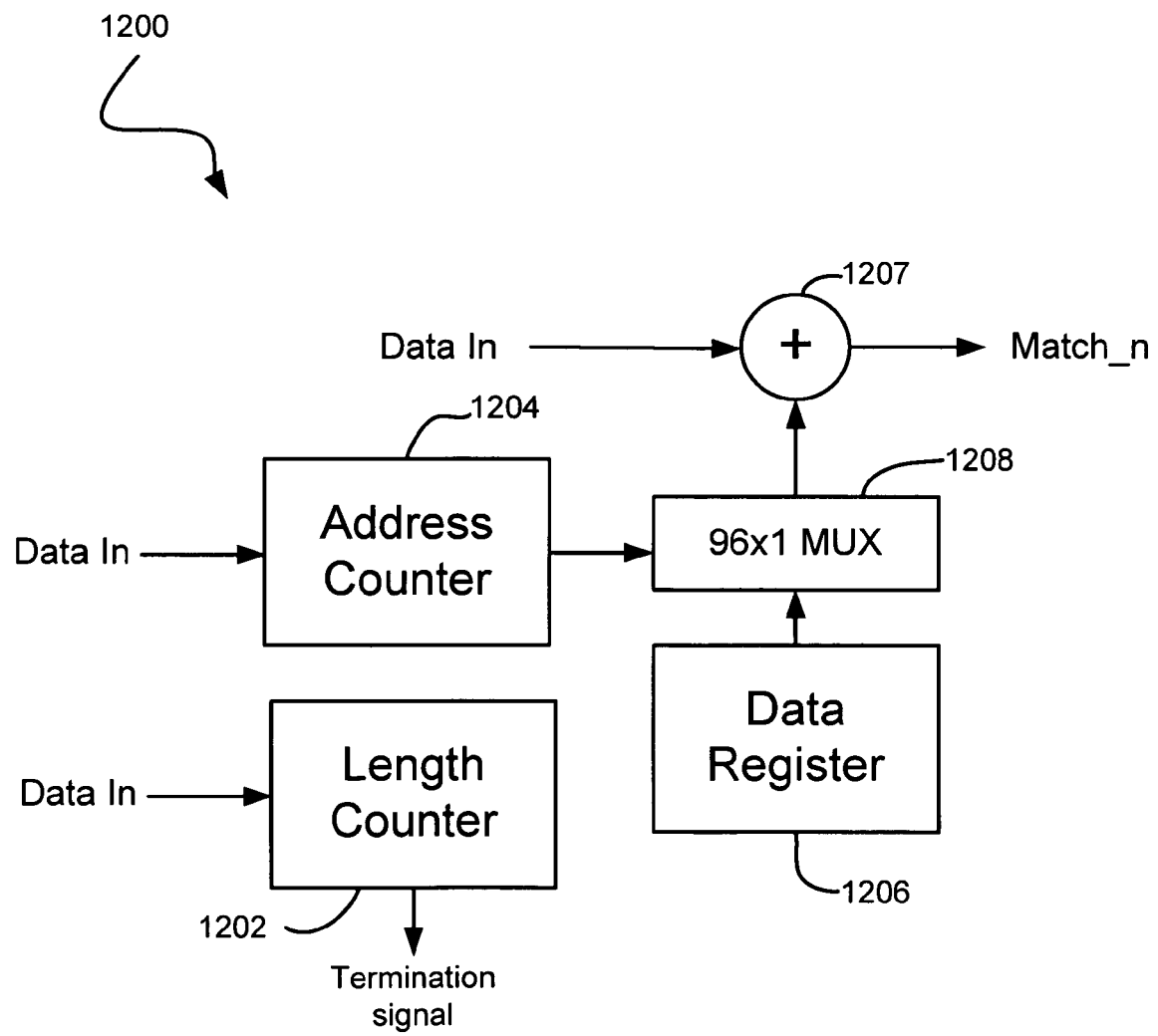
FIG. 12 is a circuit diagram of a comparison circuit that compares the activate command to a stored value.

The Interrupt output signal is then passed to the block 1200 shown in FIG. 12, which is part of the data comparison section 410 shown in FIG. 4. In this bock 1200, the incoming activate code is compared to a reference value ("activate value") stored in a data register or other memory of the host device. If the incoming value matches the stored activate value, an activate signal is generated.

As mentioned above, the Length information of the activate code (FIG. 3B) arrives first. This data is serially clocked into the length counter 1202. If the Length value is not zero, the Address is clocked serially into the address counter 1204. The circuit 1200 is now ready to compare the Mask bits with the activate value stored in the data register 1206. The stored bit from the data register 1206 to be compared is selected by the address counter 1204. The comparator 1207 in this example is a simple Exclusive-Or (XOR) function (or other suitable logic function used in the art for comparing bits) between the incoming data bit and the bit selected by the address counter 1204 through the 96×1 multiplexer (MUX) 1208. If the length counter 1202 has counted down to zero and there has been no mismatch, an activate signal is generated and the device may be activated. If a mismatch is detected, the circuit 1200 is reset. In one example of use, the address field value can instruct the circuit to start the comparison at bit 15 of the mask, and the length field can stop the comparison at bit 60. Only if the Mask bits 15-60 match the stored activate value will the device change power states.

A benefit of this design is that the data does not need to be stored anywhere or shifted in. Rather the address counter 1204 is programmed with the value from the address field. The data from the internal register is MUXed out a bit at a time and compared on the fly to the incoming data as it is received. This eliminates the requirement for a 96 bit shift register for the incoming data.

The data comparison section 410 (FIG. 4) can also know to activate if the interrupt matches and the subsequent activate command is a series of all 0's. Note that a special activate code can be some sequence of values other than all zeros, such as all ones, or a second sequence of ones and zeros. Additional logic and/or memory may be required to identify and/or match these other values, as will be understood by one of skill in the art.

In some cases, the tag may have to detect multiple codes, such as a public activate codes, private activate codes, codes for specific classes of tags or items, and codes specific to the tag. For instance a hierarchical structure can also be used, where one code activates all tags in a warehouse, another code activates the cleaning supply tags, and a third code is specific to each tag. One skilled in the art will appreciate the many options that are available to the designer and user when multiple codes can be used.

Figure 13:
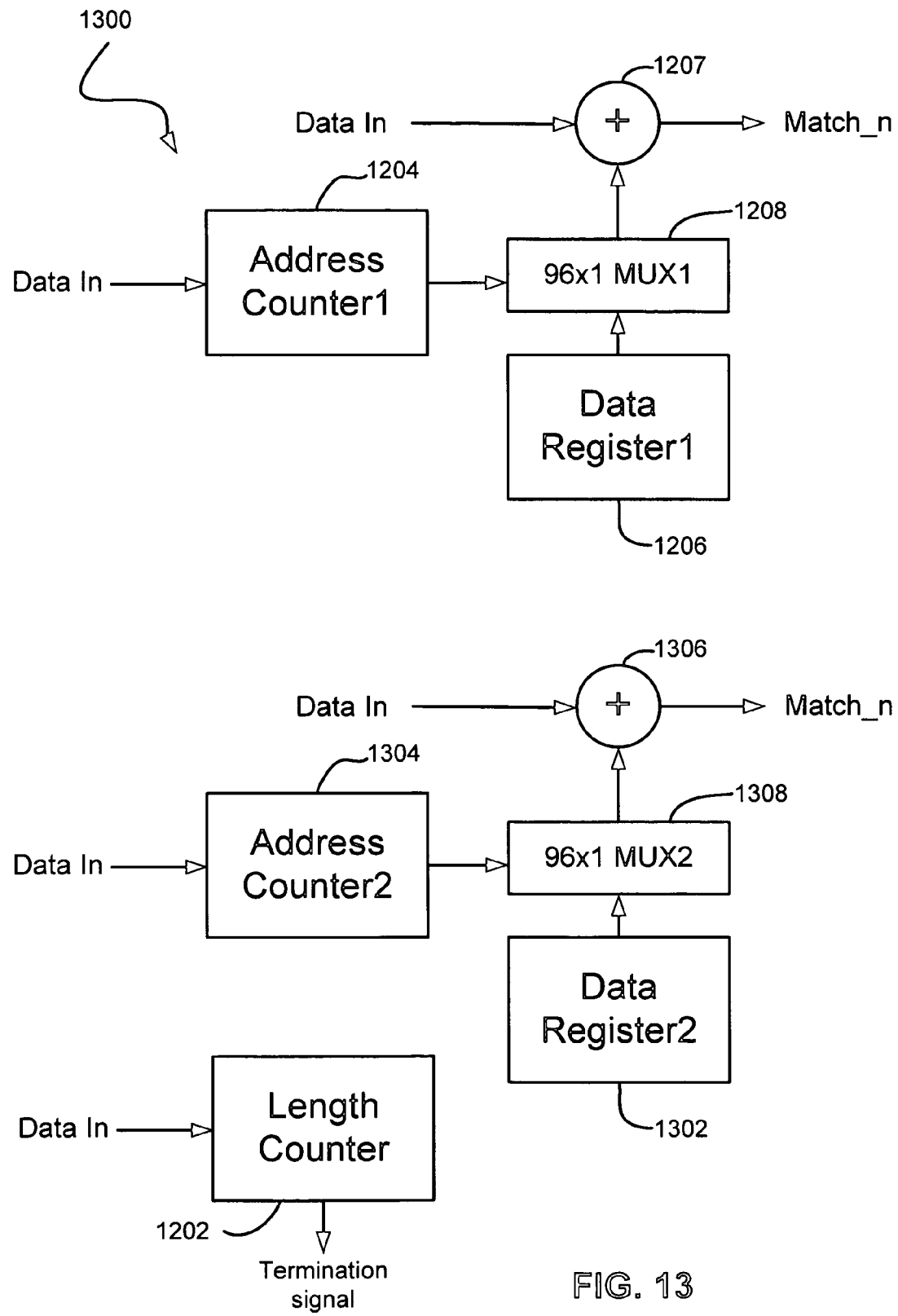
FIG. 13 is a circuit diagram of a comparison circuit that compares the activate command to multiple stored values.

To enable use with multiple codes, portions of the data comparison portion 410 of the circuit can be replicated (with the other code(s) stored in the memory), as will be understood by one skilled in the art. FIG. 13 illustrates one example 1300, which includes the components of FIG. 12, as well as a second address counter 1304, a second MUX 1308, a second XOR device 1306, and a second data register 1302. Only one length counter 1202 is needed, though duplicates could be provided. The incoming data is analyzed and the mask compared to two stored activate codes, one from each code register 1206, 1302. If the incoming code matches one of the stored values, an activate command can be generated. Note that in a simpler variation, a single address counter 1204 can drive both MUXes, and any others present.

Figure 14:
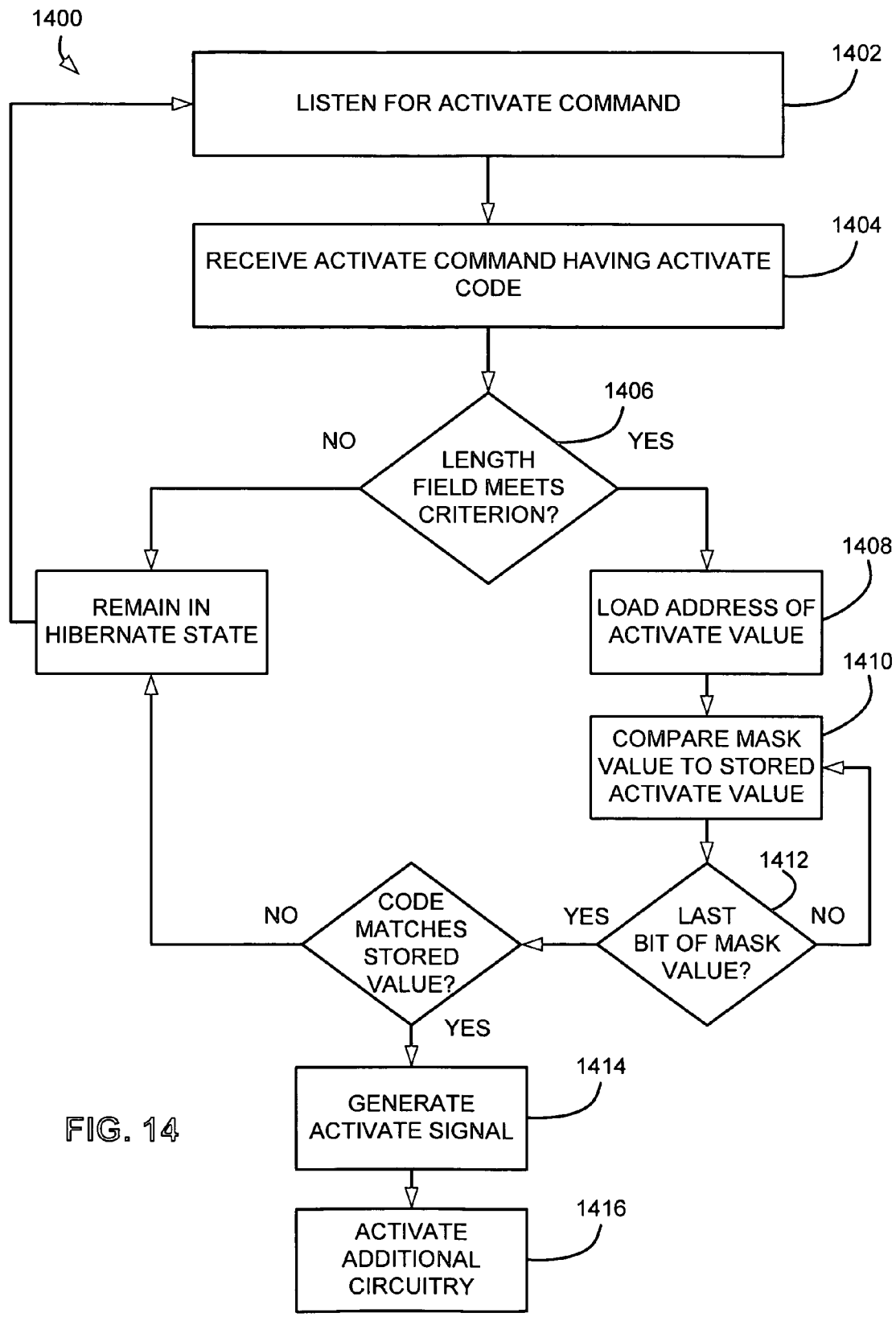
FIG. 14 is a flow diagram of a method for activating a device according to one embodiment.

FIG. 14 depicts a method 1400 for activating a device according to one embodiment. In operation 1402, the device listens for an activate code. Preferably, the device listens for the activate code periodically, though power drain is minimal and so continuous monitoring is preferred. Upon receiving the activate code in operation 1404, the length field is compared to a stored length value in operation 1406 for determining whether the length field meets a predefined criterion. If the length field meets the predefined criterion, an address of the activate value is loaded in operation 1408 (if an address field is present) and the appropriate bits (mask value) of the mask field are compared to a stored activate value in operation 1410. The comparison is terminated in operation 1412 upon comparing the final bit of the mask field as specified by the length field. An activate signal is generated in operation 1414 if the mask value matches the stored activate value. The activate signal can be used to activate additional circuitry in operation 1416.

EXAMPLE 1

In a retail store, RFID tag readers are placed near the store exits. The length fields are all set to zero so that all tags respond when in range of a reader. Accordingly, the readers continuously transmit zeros. If a tag responds, a security alarm is activated.

EXAMPLE 2

In a retail store, a tagged item is on a shelf and it is desired to reduce depletion of the battery as well as avoid unauthorized access to the tag. The length value is set to some number greater than zero. Different tags may have different lengths or different activate codes.

EXAMPLE 3

In a supply chain, the length field, and thus the mask field, are set small (e.g., mask value length <16 bits) and no address offset to enable quick identification of RFID tags. Upon entering a pharmacy, the tags are reprogrammed to have a mask field of many bits (e.g., mask value length >64 bits) and the address field is set to provide an offset of 12 bits. The resulting length field has a value of 86 bits.

EXAMPLE 4

In a warehouse, the stored minimum length value of RFID tags in Group A is set at 16 bits. The stored minimum length value of RFID tags in Group B is set at 32 bits. An activate command is sent having a length field value of 12 bits. No tags in Groups A or B respond. An activate command is sent having a length field value of 20 bits. Tags in Group A analyze the activate code, while the tags in Group B do not. An activate command is sent having a length field value of 40 bits. Tags in Groups A and B analyze the activate code.

EXAMPLE 5

In a supply chain, different users (including entities and/or systems) use different activate codes (or portions thereof) as a device (e.g., RFID tag) passes through the supply chain. Authorized users at various stages in the supply chain change the activate code by submitting a password, etc. Now the device only responds to that particular activate command (as it otherwise remains in hibernate mode). When the device moves on to another stage, the subsequent user receives the activate code from the prior user, and possibly the password if the subsequent user does not already have it.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for activating a device, comprising:
listening for an activate code; receiving the activate code, the activate code having a length field and a mask field, the mask field including a mask value, the length field specifying a length of the mask field to a final bit of the mask value; comparing the length field to a stored length value for determining whether the length field meets a predefined criterion; comparing the mask value in the mask field to a stored activate value if the length field meets the predefined criterion; and activating additional circuitry if the mask value matches the stored activate value,
wherein the predefined criterion is that a value of the length field is greater than the stored length value.

2. A method for activating a device, comprising:
listening for an activate code; receiving the activate code, the activate code having a length field and a mask field, the mask field including a mask value, the length field specifying a length of the mask field to a final bit of the mask value; comparing the length field to a stored length value for determining whether the length field meets a predefined criterion; comparing the mask value in the mask field to a stored activate value if the length field meets the predefined criterion; and activating additional circuitry if the mask value matches the stored activate value,
wherein the predefined criterion is that the length field is no greater than the stored length value.

* * * * *